US012013652B2

(12) United States Patent
Inoue et al.

(10) Patent No.: US 12,013,652 B2
(45) Date of Patent: Jun. 18, 2024

(54) HEATING DEVICE, FIXING DEVICE, AND IMAGE FORMING APPARATUS INCLUDING A ROTATOR HOLDER AND REFLECTOR

(71) Applicants: Daisuke Inoue, Tokyo (JP); Takayuki Andoh, Kanagawa (JP); Masahiro Samei, Kanagawa (JP); Kota Shiodera, Tokyo (JP); Hiroshi Yoshinaga, Chiba (JP)

(72) Inventors: Daisuke Inoue, Tokyo (JP); Takayuki Andoh, Kanagawa (JP); Masahiro Samei, Kanagawa (JP); Kota Shiodera, Tokyo (JP); Hiroshi Yoshinaga, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/160,080

(22) Filed: Jan. 26, 2023

(65) Prior Publication Data

US 2023/0297010 A1 Sep. 21, 2023

(30) Foreign Application Priority Data

Mar. 17, 2022 (JP) ................................ 2022-042528
Nov. 21, 2022 (JP) ................................ 2022-185659

(51) Int. Cl.
*G03G 15/20* (2006.01)
*H05B 3/00* (2006.01)

(52) U.S. Cl.
CPC ..... *G03G 15/2017* (2013.01); *G03G 15/2025* (2013.01); *G03G 15/2053* (2013.01); *H05B 3/0066* (2013.01); *G03G 2215/2035* (2013.01)

(58) Field of Classification Search
CPC ........... G03G 15/2025; G03G 15/2017; G03G 15/2007; G03G 15/2053; G03G 2215/2035; H05B 1/0241; H05B 3/0066
(Continued)

(56) References Cited

U.S. PATENT DOCUMENTS 5,559,593 A 9/1996 Yoshinaga et al.
5,887,224 A 3/1999 Mizuishi et al.
(Continued)

FOREIGN PATENT DOCUMENTS

EP 2808744 A1 * 12/2014 ......... G03G 15/2017
JP 2010-026058 2/2010
(Continued)

OTHER PUBLICATIONS

U.S. Appl. No. 17/863,404, filed Jul. 13, 2022, Hiroyuki Shimada, et al.
(Continued)

*Primary Examiner* — Robert B Beatty
(74) *Attorney, Agent, or Firm* — Harness, Dickey & Pierce, P.L.C.

(57) ABSTRACT

A heating device includes a rotator, a heating source, a reflector, a shield, a rotator holder, and a liquid or semi-solid substance. The rotator is rotatably held. The heating source heats the rotator. The reflector reflects radiant heat emitted from the heating source. The shield is disposed closer to a longitudinal end portion of the rotator than to a longitudinal center portion of the rotator to shield, between the heating source and the rotator, the radiant heat emitted from the heating source. The shield has a reflectance lower than a reflectance of the reflector. The rotator holder holds the longitudinal end portion of the rotator. The liquid or semi-solid substance has lubricity and adheres to the rotator holder.

11 Claims, 10 Drawing Sheets

(58) Field of Classification Search
USPC .......................... 399/329, 330, 333; 219/216
See application file for complete search history.

(56) References Cited

U.S. PATENT DOCUMENTS 5,915,143 A 6/1999 Watanabe et al.
6,006,050 A 12/1999 Watanabe et al.
6,055,388 A 4/2000 Watanabe et al.
6,055,394 A 4/2000 Suda et al.
6,101,351 A 8/2000 Suda et al.
6,208,826 B1 3/2001 Yoshinaga et al.
6,256,465 B1 7/2001 Yoshinaga et al.
6,334,039 B1 12/2001 Yoshinaga et al.
6,336,013 B1 1/2002 Suda et al.
6,366,754 B1 4/2002 Sato et al.
2001/0012460 A1 8/2001 Sato et al.
2001/0017995 A1 8/2001 Sato et al.
2001/0022905 A1 9/2001 Kosuge et al.
2001/0053298 A1 12/2001 Fujishiro et al.
2002/0018663 A1 2/2002 Furukawa et al.
2002/0067936 A1 6/2002 Yasui et al.
2003/0000933 A1 1/2003 Yoshinaga et al.
2003/0007813 A1 1/2003 Yasui et al.
2003/0016963 A1 1/2003 Yoshinaga et al.
2003/0083180 A1 5/2003 Sato et al.
2003/0206758 A1 11/2003 Yasui et al.
2003/0215271 A1 11/2003 Yoshinaga et al.
2005/0025539 A1 2/2005 Yoshinaga
2005/0095043 A1 5/2005 Yoshinaga et al.
2006/0032581 A1 2/2006 Sato et al.
2006/0165443 A1 7/2006 Yoshinaga et al.
2006/0165448 A1 7/2006 Yoshinaga
2006/0177232 A1 8/2006 Ehara et al.
2006/0257183 A1 11/2006 Ehara et al.
2006/0280530 A1 12/2006 Andoh
2007/0059036 A1 3/2007 Yamada et al.
2007/0196152 A1 8/2007 Shimizu et al.
2008/0025751 A1 1/2008 Andoh et al.
2008/0063443 A1 3/2008 Yoshinaga et al.
2008/0131164 A1 6/2008 Ohta et al.
2008/0175620 A1 7/2008 Ohta et al.
2008/0181695 A1 7/2008 Andoh et al.
2008/0181698 A1 7/2008 Andoh et al.
2008/0253789 A1 10/2008 Yoshinaga et al.
2008/0317498 A1 12/2008 Andoh et al.
2008/0317532 A1 12/2008 Ehara et al.
2009/0022516 A1 1/2009 Ohta et al.
2009/0067902 A1 3/2009 Yoshinaga et al.
2009/0074495 A1 3/2009 Shiraki et al.
2009/0122330 A1 5/2009 Andoh et al.
2009/0123202 A1 5/2009 Yoshinaga et al.
2009/0148204 A1 6/2009 Yoshinaga et al.
2009/0169232 A1 7/2009 Kunii et al.
2009/0245865 A1 10/2009 Shinshi et al.
2010/0092220 A1 4/2010 Hasegawa et al.
2010/0092221 A1 4/2010 Shinshi et al.
2010/0202809 A1 8/2010 Shinshi et al.
2010/0290822 A1 11/2010 Hasegawa et al.
2011/0026988 A1 2/2011 Yoshikawa et al.
2011/0044734 A1 2/2011 Shimokawa et al.
2011/0052237 A1 3/2011 Yoshikawa et al.
2011/0052245 A1 3/2011 Shinshi et al.
2011/0052282 A1 3/2011 Shinshi et al.
2011/0058862 A1 3/2011 Yamaguchi et al.
2011/0058863 A1 3/2011 Shinshi et al.
2011/0058864 A1 3/2011 Fujimoto et al.
2011/0058865 A1 3/2011 Tokuda et al.
2011/0058866 A1 3/2011 Ishii et al.
2011/0064437 A1 3/2011 Yamashina et al.
2011/0064443 A1 3/2011 Iwaya et al.
2011/0076071 A1 3/2011 Yamaguchi et al.
2011/0085832 A1 4/2011 Hasegawa et al.
2011/0116848 A1 5/2011 Yamaguchi et al.
2011/0129268 A1 6/2011 Ishii et al.
2011/0170917 A1 7/2011 Yoshikawa et al.
2011/0182634 A1 7/2011 Ishigaya et al.
2011/0182638 A1 7/2011 Ishii et al.
2011/0194869 A1 8/2011 Yoshinaga et al.
2011/0194870 A1 8/2011 Hase et al.
2011/0200368 A1 8/2011 Yamaguchi et al.
2011/0200370 A1 8/2011 Ikebuchi et al.
2011/0206427 A1 8/2011 Iwaya et al.
2011/0211876 A1 9/2011 Iwaya et al.
2011/0217056 A1 9/2011 Yoshinaga et al.
2011/0217057 A1 9/2011 Yoshinaga et al.
2011/0217093 A1 9/2011 Tokuda et al.
2011/0217095 A1 9/2011 Ishii et al.
2011/0222875 A1 9/2011 Imada et al.
2011/0222888 A1 9/2011 Ikebuchi et al.
2011/0222929 A1 9/2011 Fujimoto et al.
2011/0222930 A1 9/2011 Fujimoto et al.
2011/0222931 A1 9/2011 Shinshi et al.
2011/0229181 A1 9/2011 Iwaya et al.
2011/0229200 A1 9/2011 Yamaguchi et al.
2011/0229225 A1 9/2011 Ishii et al.
2011/0229226 A1 9/2011 Tokuda et al.
2011/0229227 A1 9/2011 Yoshikawa et al.
2011/0229228 A1 9/2011 Yoshikawa et al.
2011/0274453 A1 11/2011 Shimokawa et al.
2011/0285078 A1 11/2011 Andoh et al.
2011/0286758 A1 11/2011 Yoshinaga
2011/0299899 A1 12/2011 Ishigaya et al.
2012/0051774 A1 3/2012 Ikebuchi et al.
2012/0093532 A1 4/2012 Ishigaya et al.
2012/0093534 A1 4/2012 Waida et al.
2012/0114345 A1 5/2012 Fujimoto et al.
2012/0121303 A1 5/2012 Takagi et al.
2012/0121304 A1 5/2012 Tokuda et al.
2012/0121305 A1 5/2012 Yoshikawa et al.
2012/0148287 A1 6/2012 Samei et al.
2012/0148303 A1 6/2012 Yamaguchi et al.
2012/0148317 A1 6/2012 Samei et al.
2012/0155935 A1 6/2012 Yoshikawa et al.
2012/0155936 A1 6/2012 Yamaguchi et al.
2012/0177388 A1 7/2012 Imada et al.
2012/0177393 A1 7/2012 Ikebuchi et al.
2012/0177420 A1 7/2012 Shimokawa et al.
2012/0177423 A1 7/2012 Imada et al.
2012/0224878 A1 9/2012 Ikebuchi et al.
2012/0237273 A1 9/2012 Yoshinaga et al.
2012/0243895 A1 9/2012 Samei et al.
2013/0045032 A1 2/2013 Shimokawa et al.
2013/0051876 A1 2/2013 Ishigaya et al.
2013/0136479 A1 5/2013 Yuasa et al.
2013/0164056 A1 6/2013 Imada et al.
2013/0164058 A1 6/2013 Suzuki et al.
2013/0164059 A1 6/2013 Takagi et al.
2013/0170877 A1 7/2013 Yoshiura et al.
2013/0170879 A1 7/2013 Yoshinaga et al.
2013/0170880 A1 7/2013 Gotoh et al.
2013/0177340 A1 7/2013 Kawata et al.
2013/0183070 A1 7/2013 Kawata et al.
2013/0183071 A1 7/2013 Iwaya et al.
2013/0183072 A1 7/2013 Hase et al.
2013/0189005 A1 7/2013 Saito et al.
2013/0189008 A1 7/2013 Ishii et al.
2013/0195477 A1 8/2013 Seshita et al.
2013/0195493 A1 8/2013 Hase et al.
2013/0195523 A1 8/2013 Yamaji et al.
2013/0195524 A1 8/2013 Ishii et al.
2013/0195525 A1 8/2013 Yoshinaga et al.
2013/0202320 A1 8/2013 Hase et al.
2013/0209115 A1 8/2013 Hase et al.
2013/0209119 A1 8/2013 Yuasa et al.
2013/0209121 A1 8/2013 Uchitani et al.
2013/0209125 A1 8/2013 Uchitani et al.
2013/0209131 A1 8/2013 Uchitani et al.
2013/0209146 A1 8/2013 Yamaji et al.
2013/0209147 A1 8/2013 Ogawa et al.
2013/0209148 A1 8/2013 Suto et al.
2013/0222826 A1 8/2013 Osanai et al.
2013/0251422 A1 9/2013 Iwaya et al.
2013/0251430 A1 9/2013 Fujimoto et al.
2013/0266355 A1 10/2013 Yoshiura et al.

(56) References Cited

U.S. PATENT DOCUMENTS

2013/0308990 A1 11/2013 Masahiro et al.
2014/0010578 A1 1/2014 Ishigaya et al.
2014/0016972 A1 1/2014 Seshita et al.
2014/0079453 A1 3/2014 Arai et al.
2014/0079455 A1* 3/2014 Seki .................. G03G 15/2053 399/329
2014/0099138 A1 4/2014 Ishigaya et al.
2014/0133877 A1 5/2014 Samei et al.
2014/0133879 A1 5/2014 Seshita et al.
2014/0219672 A1 8/2014 Samei et al.
2014/0219673 A1 8/2014 Yamamoto et al.
2014/0219696 A1 8/2014 Fujimoto et al.
2014/0227001 A1 8/2014 Kishi et al.
2014/0248072 A1 9/2014 Yoshinaga et al.
2014/0270820 A1 9/2014 Saito et al.
2014/0270831 A1 9/2014 Yoshinaga et al.
2014/0270832 A1 9/2014 Saito et al.
2014/0270833 A1 9/2014 Yuasa et al.
2014/0270872 A1 9/2014 Tamaki et al.
2014/0270875 A1 9/2014 Mimbu et al.
2014/0314459 A1 10/2014 Samei
2014/0341623 A1 11/2014 Arai et al.
2014/0341624 A1 11/2014 Arai et al.
2014/0341625 A1 11/2014 Imada et al.
2014/0341626 A1 11/2014 Mimbu et al.
2014/0341627 A1 11/2014 Yoshikawa et al.
2014/0356036 A1 12/2014 Shimokawa et al.
2014/0356037 A1 12/2014 Shimokawa et al.
2014/0356038 A1 12/2014 Arai et al.
2014/0369046 A1 12/2014 Andoh
2014/0369703 A1 12/2014 Hase et al.
2015/0023705 A1 1/2015 Kawata et al.
2015/0063884 A1 3/2015 Iwaya et al.
2015/0071688 A1 3/2015 Yamaguchi et al.
2015/0078768 A1 3/2015 Yamaguchi et al.
2015/0098738 A1 4/2015 Arai et al.
2015/0104230 A1 4/2015 Uchitani et al.
2015/0160591 A1 6/2015 Hase et al.
2015/0168897 A1 6/2015 Ogawa et al.
2015/0185671 A1 7/2015 Ikebuchi et al.
2015/0212459 A1 7/2015 Hase et al.
2015/0220028 A1 8/2015 Samei et al.
2015/0220029 A1 8/2015 Samei et al.
2015/0227095 A1 8/2015 Uchitani et al.
2015/0234329 A1 8/2015 Hase et al.
2015/0268597 A1 9/2015 Arai et al.
2015/0346662 A1 12/2015 Kawarasaki et al.
2015/0355586 A1 12/2015 Fujimoto et al.
2015/0378290 A1 12/2015 Kawata et al.
2016/0004197 A1 1/2016 Imada et al.
2016/0041511 A1 2/2016 Fujii et al.
2016/0054691 A1 2/2016 Hase et al.
2016/0098003 A1 4/2016 Uchitani et al.
2016/0147185 A1 5/2016 Hase et al.
2016/0223961 A1 8/2016 Takagi et al.
2016/0223963 A1 8/2016 Yoshinaga et al.
2016/0231672 A1 8/2016 Seto et al.
2016/0238975 A1 8/2016 Seki et al.
2016/0246228 A1 8/2016 Fujimoto et al.
2016/0274510 A1 9/2016 Hase et al.
2016/0274511 A1 9/2016 Ogino et al.
2016/0274514 A1 9/2016 Ishii et al.
2016/0327891 A1 11/2016 Ikebuchi et al.
2016/0334742 A1 11/2016 Kobashigawa et al.
2016/0378027 A1 12/2016 Sawada et al.
2016/0378028 A1 12/2016 Fujiwara et al.
2017/0003634 A1 1/2017 Samei et al.
2017/0010570 A1 1/2017 Fujimoto et al.
2017/0045850 A1 2/2017 Fujii et al.
2017/0102652 A1 4/2017 Imada et al.
2017/0134598 A1 5/2017 Nagano et al.
2017/0142265 A1 5/2017 Horikawa et al.
2017/0176898 A1* 6/2017 Izawa ................ G03G 15/2042
2017/0176906 A1 6/2017 Sawada et al.
2017/0176907 A1 6/2017 Sawada et al.
2017/0185009 A1 6/2017 Yoshinaga et al.
2017/0185015 A1 6/2017 Yoshinaga et al.
2017/0185019 A1 6/2017 Seo et al.
2017/0185020 A1 6/2017 Seki et al.
2017/0185021 A1 6/2017 Seki et al.
2017/0255147 A1 9/2017 Seki et al.
2017/0255150 A1 9/2017 Hase et al.
2017/0261900 A1 9/2017 Sawada et al.
2017/0277091 A1 9/2017 Uchitani et al.
2017/0285542 A1 10/2017 Hase et al.
2017/0293245 A1 10/2017 Kawata et al.
2017/0364000 A1 12/2017 Seki et al.
2018/0011432 A1 1/2018 Yoshinaga et al.
2018/0017910 A1 1/2018 Sawada et al.
2018/0046121 A1 2/2018 Kawata et al.
2018/0059587 A1 3/2018 Sawada et al.
2018/0067431 A1 3/2018 Nanno et al.
2018/0107142 A1 4/2018 Samei et al.
2018/0120741 A1 5/2018 Yoshinaga et al.
2018/0157198 A1 6/2018 Seto et al.
2018/0173138 A1 6/2018 Seki et al.
2018/0267449 A1 9/2018 Naitoh et al.
2018/0270375 A1 9/2018 Imaki et al.
2018/0284669 A1 10/2018 Fujimoto et al.
2018/0335733 A1 11/2018 Matsuda et al.
2018/0348680 A1 12/2018 Fujimoto et al.
2018/0356754 A1 12/2018 Yoshinaga et al.
2019/0068815 A1 2/2019 Andoh et al.
2019/0121271 A1 4/2019 Hase et al.
2019/0243291 A1 8/2019 Matsuda et al.
2019/0286025 A1 9/2019 Yamaguchi et al.
2019/0286029 A1 9/2019 Adachi et al.
2019/0377286 A1 12/2019 Naitoh et al.
2020/0033766 A1 1/2020 Hase et al.
2020/0033767 A1 1/2020 Adachi et al.
2020/0033775 A1 1/2020 Inoue et al.
2020/0033776 A1 1/2020 Yoshinaga et al.
2020/0096897 A1 3/2020 Ota et al.
2020/0117126 A1 4/2020 Hase et al.
2020/0241452 A1 7/2020 Saitoh et al.
2020/0241453 A1 7/2020 Okamoto et al.
2020/0249601 A1 8/2020 Inoue et al.
2020/0249602 A1 8/2020 Inoue et al.
2020/0292972 A1 9/2020 Inoue et al.
2020/0292973 A1 9/2020 Furuichi et al.
2020/0341419 A1 10/2020 Shimada et al.
2020/0379384 A1 12/2020 Samei et al.
2020/0401067 A1 12/2020 Samei et al.
2021/0041811 A1* 2/2021 Shimada ............ G03G 15/2025
2021/0157259 A1 5/2021 Inoue et al.
2021/0191301 A1 6/2021 Fujimoto et al.
2021/0223730 A1 7/2021 Hase et al.
2021/0311420 A1 10/2021 Yoshinaga et al.
2021/0318655 A1 10/2021 Inoue et al.
2022/0026834 A1 1/2022 Yoshinaga
2022/0291613 A1 9/2022 Yamaguchi et al.
2022/0299909 A1 9/2022 Shiodera et al.
2022/0299919 A1 9/2022 Inoue et al.
2022/0299920 A1 9/2022 Shimada et al.
2022/0308511 A1 9/2022 Someya et al.
2022/0377197 A1 11/2022 Samei
2022/0382192 A1 12/2022 Inoue et al.
2023/0324838 A1* 10/2023 Samei ................ G03G 15/2053 399/330

FOREIGN PATENT DOCUMENTS

JP 2013-164453 8/2013
JP 2013164453 A * 8/2013

OTHER PUBLICATIONS

U.S. Appl. No. 17/864,434, filed Jul. 14, 2022, Yukimichi Someya, et al.

(56) References Cited

OTHER PUBLICATIONS

U.S. Appl. No. 17/900,880, filed Sep. 1, 2022, Toshiyuki Kabata, et al.

* cited by examiner

HEATING DEVICE, FIXING DEVICE, AND IMAGE FORMING APPARATUS INCLUDING A ROTATOR HOLDER AND REFLECTOR

CROSS-REFERENCE TO RELATED APPLICATIONS

This patent application is based on and claims priority pursuant to 35 U.S.C. § 119(a) to Japanese Patent Application Nos. 2022-042528, filed on Mar. 17, 2022, and 2022-185659, filed on Nov. 21, 2022, in the Japan Patent Office, the entire disclosure of each of which is hereby incorporated by reference herein.

BACKGROUND

Technical Field

Embodiments of the present disclosure relate to a heating device, a fixing device, and an image forming apparatus.

RELATED ART

As an example of a heating device included in an image forming apparatus such as a copier or a printer, a fixing device is known that heats a recording medium such as a sheet of paper and fixes an unfixed image onto the recording medium.

Such a fixing device includes a pair of rotators that contact each other and a heating source that heats at least one of the rotators. When a sheet passes through an area of contact between the rotators, the unfixed image on the sheet is fixed under heat and pressure.

Most of the radiant heat emitted from the heating source is consumed as thermal energy for heating the rotator. However, the temperature of the components around the rotator may rise when the components around the rotator are irradiated with part of the radiant heat or when the heat of the rotator whose temperature has risen is conducted to the components around the rotator.

In a heating device such as the fixing device, a lubricant such as oil or grease is typically used to smoothly rotate the rotator. When the temperature of such a lubricant rises due to the heat from the heating source disposed in the heating device, some low-molecular-weight components of the lubricant are volatilized and aggregated when cooled in the atmosphere. Thus, fine particles may be generated.

Currently, regulations regarding fine particles (i.e., particles having a diameter of 100 nm to 2500 nm) discharged from products have been strengthened. For example, the German Blue Angel standard specifies reference values for the number of generated fine particles and ultrafine particles having a diameter of 5.6 nm to 560 nm (number/10 minutes). Thus, the generation of fine particles and ultrafine particles from a lubricating substance such as the lubricant is to be reduced.

SUMMARY

According to an embodiment of the present disclosure, a novel heating device includes a rotator, a heating source, a reflector, a shield, a rotator holder, and a liquid or semi-solid substance. The rotator is rotatably held. The heating source heats the rotator. The reflector reflects radiant heat emitted from the heating source. The shield is disposed closer to a longitudinal end portion of the rotator than to a longitudinal center portion of the rotator to shield, between the heating source and the rotator, the radiant heat emitted from the heating source. The shield has a reflectance lower than a reflectance of the reflector. The rotator holder holds the longitudinal end portion of the rotator. The liquid or semi-solid substance has lubricity and adheres to the rotator holder.

According to an embodiment of the present disclosure, a novel fixing device includes the heating device and a counter rotator. The heating device heats a recording medium bearing an unfixed image. The counter rotator contacts an outer circumferential surface of the rotator of the heating device to fix the unfixed image onto the recording medium.

According to an embodiment of the present disclosure, a novel image forming apparatus includes the fixing device.

According to an embodiment of the present disclosure, a novel image forming apparatus includes the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
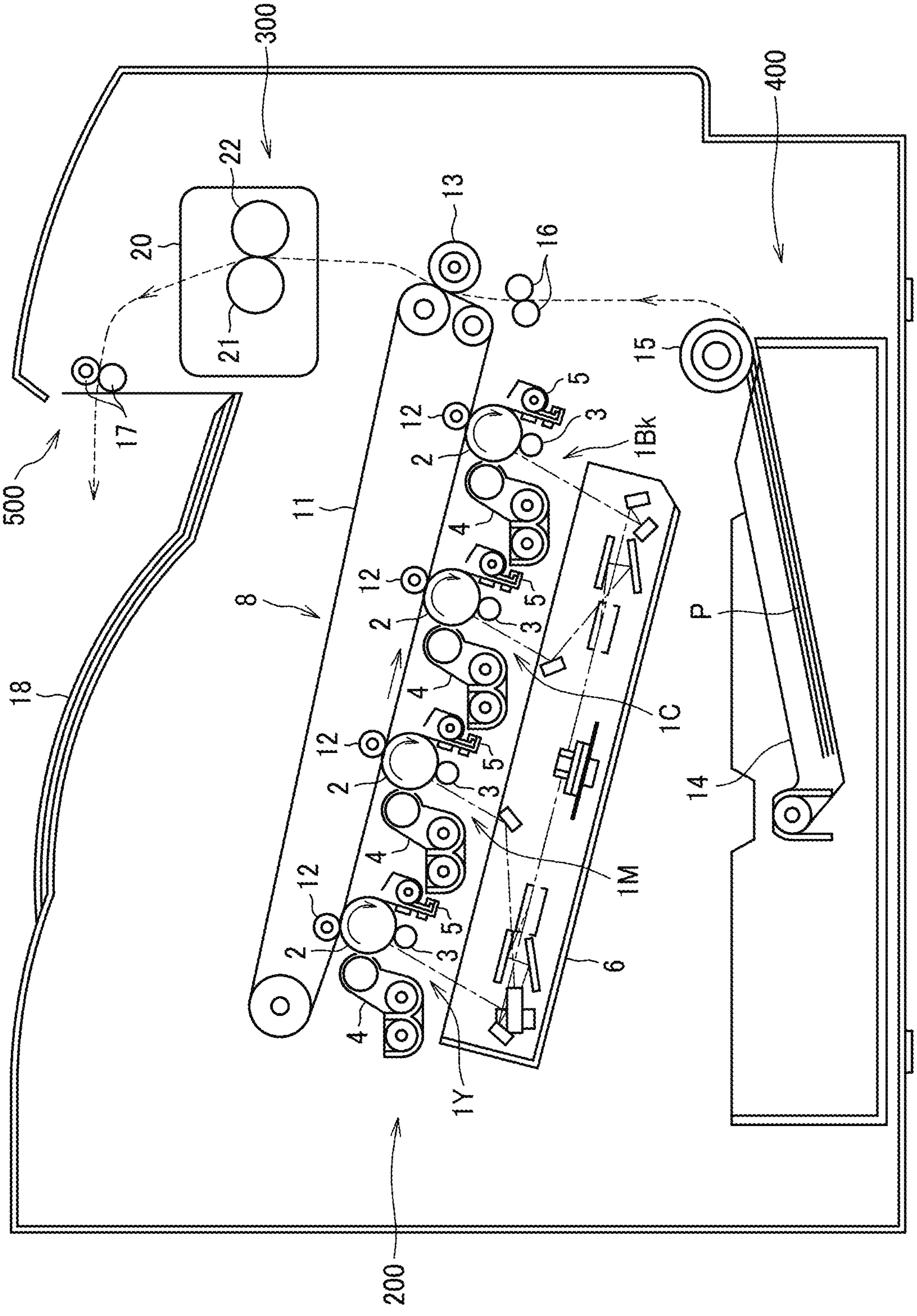
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

Note that, in the following description, suffixes Y, M, C, and Bk denote colors of yellow, magenta, cyan, and black, respectively. To simplify the description, these suffixes are omitted unless necessary.

As used herein, the term "connected/coupled" includes both direct connections and connections in which there are one or more intermediate connecting elements.

FIG. 1 is a schematic diagram illustrating a configuration of an image forming apparatus according to an embodiment of the present disclosure.

In the following description, the "image forming apparatus" may be a printer, a copier, a scanner, a facsimile machine, or a multifunction peripheral having at least two of printing, copying, scanning, and facsimile functions. "Image formation" means the formation of images with meanings such as characters and figures and the formation of images with no meanings such as patterns.

Initially, with reference to FIG. 1, a description is given of the overall configuration and operation of an image forming apparatus 100 according to the present embodiment.

As illustrated in FIG. 1, the image forming apparatus 100 according to the present embodiment includes an image forming section 200, a fixing section 300, a recording-medium supplying section 400, and a recording-medium ejecting section 500. The image forming section 200 forms an image on a sheet-like recording medium such as a sheet of paper. The fixing section 300 fixes the image onto the recording medium. The recording-medium supplying section 400 supplies the recording medium to the image forming section 200. The recording-medium ejecting section 500 ejects the recording medium to the outside of the image forming apparatus 100.

The image forming section 200 includes four process units 1Y, 1M, 1C, and 1Bk as image forming units, an exposure device 6, and a transfer device 8. The exposure device 6 forms an electrostatic latent image on a photoconductor 2 included in each of the process units 1Y, 1M, 1C, and 1Bk. The transfer device 8 transfers an image onto the recording medium.

The process units 1Y, 1M, 1C, and 1Bk have identical configurations, except that the process units 1Y, 1M, 1C, and 1Bk contain toners as developers in different colors, namely, yellow (Y), magenta (M), cyan (C), and black (Bk) corresponding to color-separation components of a color image. Specifically, each of the process units 1Y, 1M, 1C, and 1Bk includes the photoconductor 2, a charger 3, a developing device 4, and a cleaner 5. The photoconductor 2 serves as an image bearer having a surface that bears an electrostatic latent image and a resultant toner image. The charger 3 charges the surface of the photoconductor 2. The developing device 4 supplies toner as a developer to the electrostatic toner image formed on the surface of the photoconductor 2, rendering the electrostatic latent image visible as a toner image. In short, the developing device 4 forms a toner image on the photoconductor 2. The cleaner 5 cleans the surface of the photoconductor 2.

The transfer device 8 includes an intermediate transfer belt 11, four primary transfer rollers 12, and a secondary transfer roller 13. The intermediate transfer belt 11 is an endless belt entrained around a plurality of support rollers. The four primary transfer rollers 12 are disposed inside a loop formed by the intermediate transfer belt 11. Each of the four primary transfer rollers 12 contacts the corresponding photoconductor 2 via the intermediate transfer belt 11 to form an area of contact, called a primary transfer nip, between the intermediate transfer belt 11 and the photoconductor 2. The secondary transfer roller 13 contacts an outer circumferential surface of the intermediate transfer belt 11 to form an area of contact, called a secondary transfer nip, between the secondary transfer roller 13 and the intermediate transfer belt 11.

The fixing section 300 includes a fixing device 20 as a heating device that heats the recording medium bearing the transferred image. The fixing device 20 includes a fixing belt 21 and a pressure roller 22. The fixing belt 21 heats the image on the recording medium. The pressure roller 22 contacts the fixing belt 21 to form an area of contact, called a fixing nip, between the fixing belt 21 and the pressure roller 22.

The recording-medium supplying section 400 includes an input tray 14 and a sheet feeding roller 15. Sheets P as recording media are stored on the input tray 14. The sheet feeding roller 15 feeds the sheets P one at a time from the input tray 14. Although the "recording medium" will be described as a "sheet" below, the "recording medium" is not limited to a sheet of paper. Examples of the "recording medium" include, but are not limited to, a sheet of paper, an overhead projector (OHP) transparency, fabric, a metal sheet, a plastic film, or a prepreg sheet obtained by impregnating carbon fibers with a resin in advance. The sheet of paper may be a sheet of plain paper, thick paper, thin paper, coated paper such as art paper, or tracing paper. Examples of the sheet of paper include, but are not limited to, a postcard and an envelope in addition to the aforementioned kinds of sheets of paper.

The recording-medium ejecting section 500 includes an output roller pair 17 and an output tray 18. The output roller pair 17 ejects or outputs the sheet P to the outside of the image forming apparatus 100. The sheet P that is ejected by the output roller pair 17 rests on the output tray 18.

To provide a fuller understanding of the embodiments of the present disclosure, a description is now given of the printing operation of the image forming apparatus 100 according to the present embodiment, with continued reference to FIG. 1.

As the image forming apparatus 100 starts the image forming operation, the photoconductor 2 of each of the process units 1Y, 1M, 1C, and 1Bk and the intermediate transfer belt 11 of the transfer device 8 start rotating. The sheet feeding roller 15 also starts rotating to feed the sheet P from the input tray 14. The fed sheet P comes into contact with a timing roller pair 16 and stops. Thus, the conveyance of the sheet P is temporarily stopped until an image to be transferred to the sheet P is formed.

In each of the process units 1Y, 1M, 1C, and 1Bk, the charger 3 uniformly charges the surface of the photoconductor 2 at a high electric potential. According to image information of a document read by a document reading device or print information instructed to print by a terminal, the exposure device 6 exposes the charged surface of each of the photoconductors 2. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image, rendering the electrostatic latent image visible as a toner image. Thus, a toner image is formed on the surface of each of the photoconductors 2. As the photoconductor 2 rotates, the toner image that is thus formed on the photoconductor 2 reaches the primary transfer nip defined by the primary transfer roller 12. At the primary transfer nip, the toner image is transferred onto the intermediate transfer belt 11 rotating. Specifically, the toner images are sequentially transferred from the respective photoconductors 2 onto the intermediate transfer belt 11 such that the toner images are superimposed one atop another, as a composite full-color toner image on the intermediate transfer belt 11. Thus, a full-color toner image is formed on the intermediate transfer belt 11. Any one of the process units 1Y, 1M, 1C, and 1Bk may be used to form a monochrome image. Alternatively, any two or three of the process units 1Y, 1M, 1C, and 1Bk may be used to form a bicolor image or tricolor image, respectively. After the toner image is transferred onto the intermediate transfer belt 11, the cleaner 5 removes residual toner from the photoconductor 2. The residual toner refers to toner that has failed to be transferred onto the intermediate transfer belt 11 and therefore remains on the surface of the photoconductor 2.

As the intermediate transfer belt 11 rotates, the full-color toner image on the intermediate transfer belt 11 is conveyed to the secondary transfer nip defined by the secondary transfer roller 13. At the secondary transfer nip, the full-color toner image is transferred onto the sheet P conveyed by the timing roller pair 16. The sheet P bearing the full-color toner image is conveyed to the fixing device 20. In the fixing device 20, the fixing belt 21 and the pressure roller 22 apply heat and pressure to the toner image on the sheet P to fix the toner image onto the sheet P. Then, the sheet P bearing the fixed toner image is conveyed to the recording-medium ejecting section 500. In the recording-medium ejecting section 500, the output roller pair 17 ejects the sheet P onto the output tray 18. Thus, a series of printing operations is completed.

Referring now to FIGS. 2 to 5, a description is given of a basic configuration of the fixing device 20 according to the present embodiment.

Figure 2:
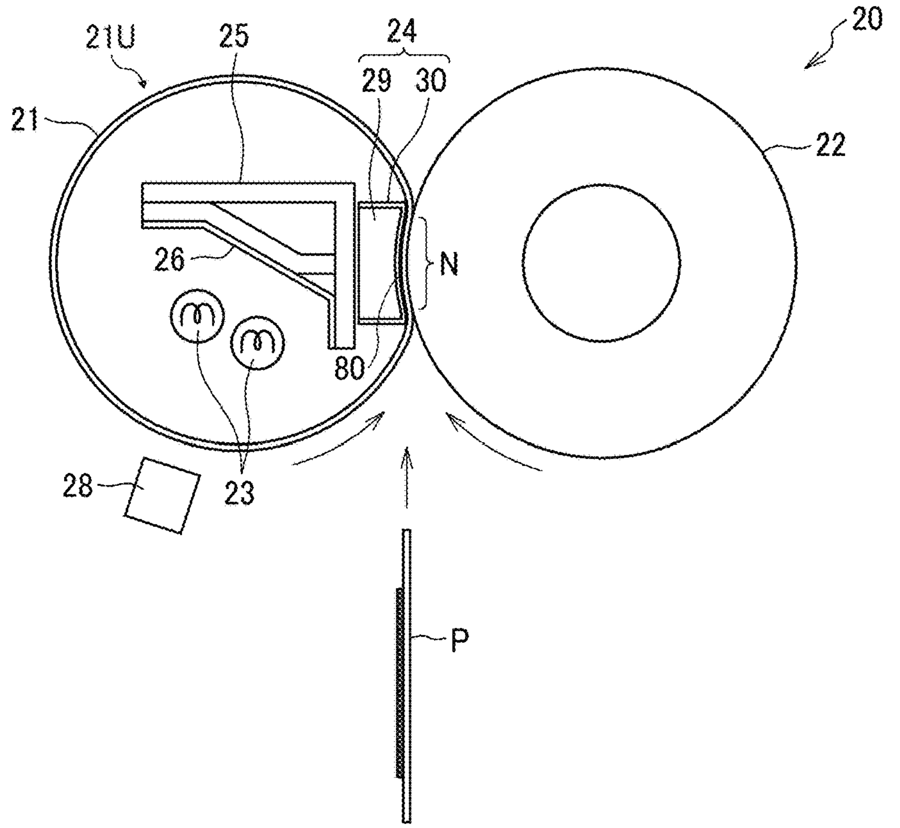
FIG. 2 is a cross-sectional view of a central portion of a fixing device included in the image forming apparatus of FIG. 1.
Figure 3:
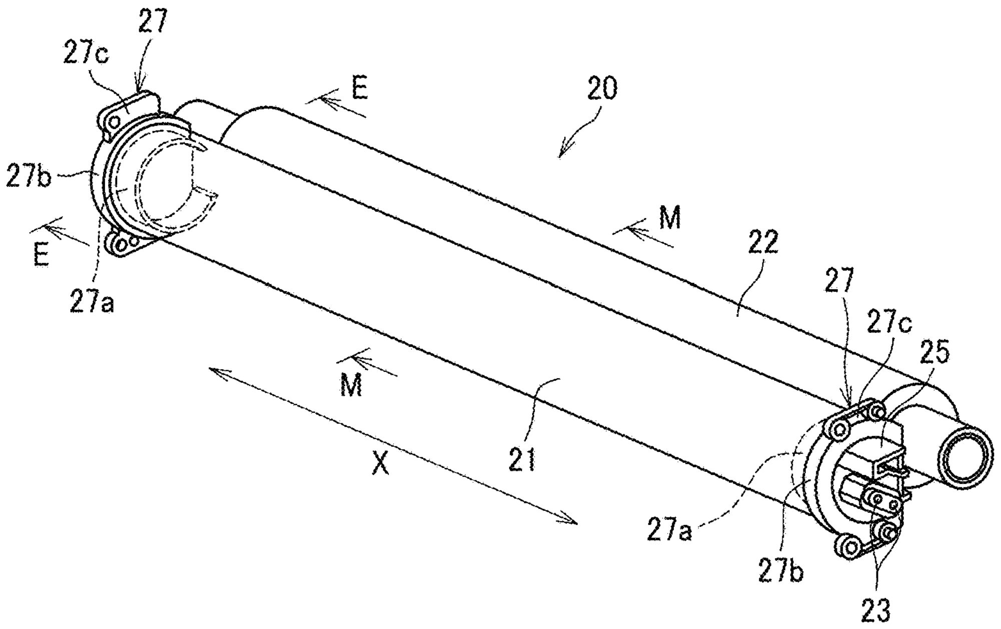
FIG. 3 is a perspective view of the fixing device of FIG. 2.

FIG. 2 is a cross-sectional view of a central portion of the fixing device 20, taken at a longitudinal center portion M of the fixing belt 21 illustrated in FIG. 3.

FIG. 3 is a perspective view of the fixing device 20.

Figure 4:
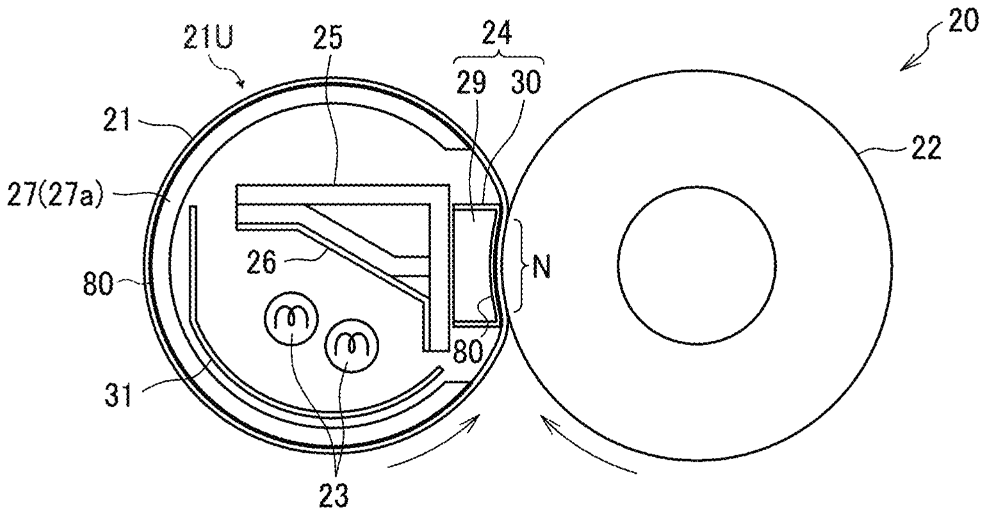
FIG. 4 is a cross-sectional view of an end portion of the fixing device of FIG. 2.

FIG. 4 is a cross-sectional view of an end portion of the fixing device 20, taken at a longitudinal end portion E of the fixing belt 21 illustrated in FIG. 3.

Figure 5:
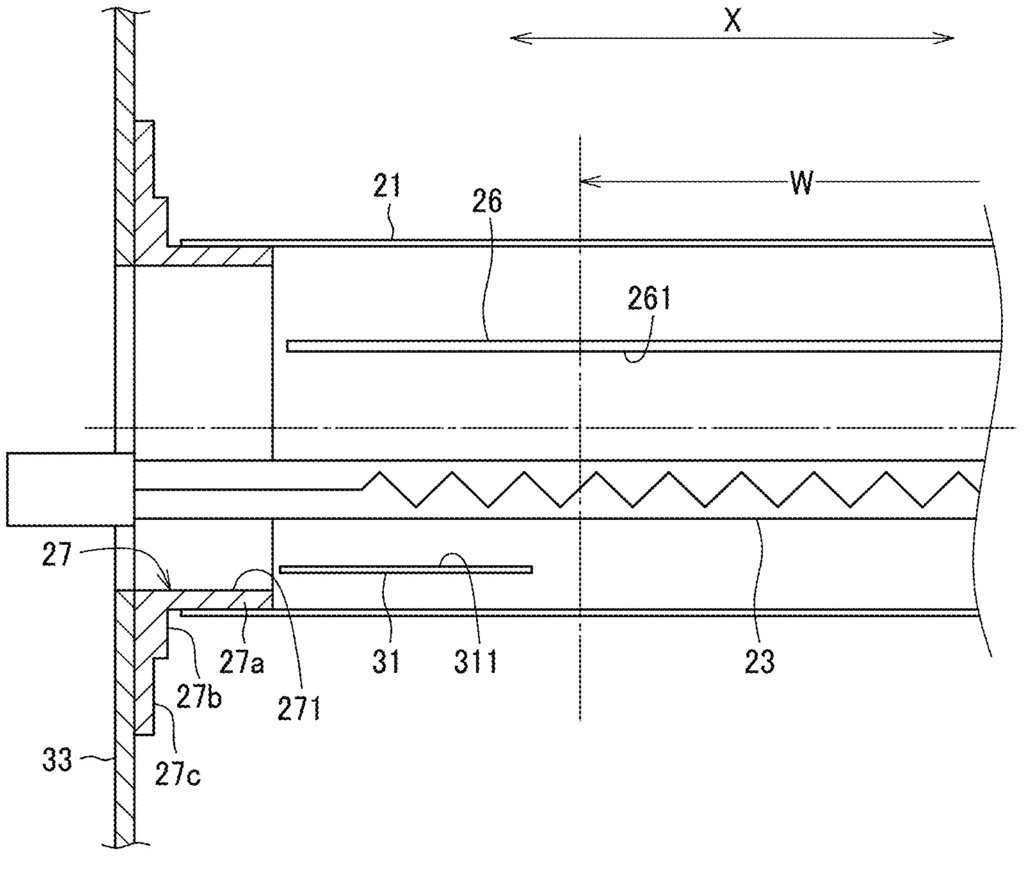
FIG. 5 is a cross-sectional view of an end portion of the fixing device of FIG. 2, taken along a longitudinal direction of a fixing belt included in the fixing device.

FIG. 5 is a cross-sectional view of an end portion of the fixing device 20, taken along a longitudinal direction of the fixing belt 21.

The above-described "longitudinal direction" of the fixing belt 21 is a direction indicated by two-headed arrow X in FIG. 3, along an axial direction of the pressure roller 22 or a width direction of the sheet P passing through the fixing nip between the fixing belt 21 and the pressure roller 22. The width direction of the sheet P is a direction intersecting a sheet conveyance direction in which the sheet P is conveyed. In the following direction, the longitudinal direction of the fixing belt 21 may be referred to as a longitudinal direction X. "Longitudinal direction" in the following description also has the same meaning.

As illustrated in FIGS. 2 to 5, the fixing device 20 according to the present embodiment includes heaters 23, a nip formation pad 24, a stay 25, a reflector 26 (see FIG. 2), belt holders 27 (see FIG. 3), shields 31 (see FIG. 4), and a temperature sensor 28 (see FIG. 2), in addition to the fixing belt 21 and the pressure roller 22 described above. The fixing belt 21 and the components disposed inside a loop formed by the fixing belt 21 constitute a belt unit 21U, which is detachably coupled to the pressure roller 22.

The fixing belt 21 is a rotator (specifically, a first rotator or a fixing rotator) that contacts an unfixed-toner bearing face of the sheet P bearing the unfixed toner to fix the unfixed toner or unfixed image onto the sheet P.

Specifically, the fixing belt 21 is an endless belt constructed of a base, an elastic layer, and a release layer laminated in this order from an inner circumferential surface to an outer circumferential surface of the fixing belt 21. The base has a thickness of 30 μm to 50 μm and is made of a metal material such as nickel or stainless steel or a resin material such as polyimide. The elastic layer has a thickness of 100 μm to 300 μm and is made of a rubber material such as silicone rubber, silicone rubber form, or fluorine rubber. The elastic layer of the fixing belt 21 eliminates slight surface asperities of the fixing belt 21 at the fixing nip, thus facilitating uniform conduction of heat to the toner image on the sheet P. The release layer of the fixing belt 21 has a thickness of 10 μm to 50 μm and is made of, for example, tetrafluoroethylene-perfluoroalkylvinylether copolymer (PFA), polytetrafluoroethylene (PTFE), polyimide, polyetherimide, or polyether sulfide (PES). The release layer of the fixing belt 21 facilitates the separation of toner contained in the toner image on the sheet P from the fixing belt 21. In other words, the release layer of the fixing belt 21 facilitates the release of the toner from the fixing belt 21. To reduce the size and thermal capacity of the fixing belt 21, the fixing belt 21 preferably has a total thickness equal to or less than 1 mm and a loop diameter equal to or less than 30 mm.

The pressure roller 22 is a rotator (specifically, a second rotator or counter rotator) disposed to face the outer circumferential surface of the fixing belt 21.

Specifically, the pressure roller 22 includes a solid iron core, an elastic layer resting on an outer circumferential surface of the core, and a release layer resting on an outer circumferential surface of the elastic layer. The core may be hollow. The elastic layer is made of, for example, silicone rubber, silicone rubber form, or fluorine rubber. The release layer is made of a fluororesin such as PFA or PTFE.

The heater 23 is a heating source that heats the fixing belt 21. In the present embodiment, a halogen heater is used as the heater 23. Instead of the halogen heater, the heater 23 may be another radiant heater such as a carbon heater or a ceramic heater. In the present embodiment, the two heaters 23 are disposed inside the loop formed by the fixing belt 21. However, the number of the heaters 23 is not limited to two. Alternatively, a single heater 23 may be disposed. Alternatively, three or more heaters 23 may be disposed.

The nip formation pad 24 is disposed inside the loop formed by the fixing belt 21. The nip formation pad 24 forms a fixing nip N between the fixing belt 21 and the pressure roller 22 under pressure from the pressure roller 22. The nip formation pad 24 includes a base pad 29 and a sliding sheet 30.

The base pad 29 is continuously disposed in the longitudinal direction X of the fixing belt 21 and fixed to the stay 25. The shape of the fixing nip N is determined by the base pad 29 under pressure from the pressure roller 22. The base pad 29 is preferably made of a heat-resistant material having a heat-resistant temperature of 200° C. or higher. For example, the base pad 29 is made of a typical heat-resistant resin such as polyether sulfone (PES), polyphenylene sulfide (PPS), liquid crystal polymer (LCP), polyether nitrile (PEN), polyamide-imide (PAI), and polyether ether ketone (PEEK). The base pad 29 made of such a heat-resistant material prevents the thermal deformation of the base pad 29 in a fixing temperature range and stabilizes the shape of the fixing nip N. Although FIG. 2 illustrates the fixing nip N having a concave shape, the fixing nip N may be flat or have another shape.

The sliding sheet 30 is a low-friction sheet interposed between the base pad 29 and the inner circumferential surface of the fixing belt 21. The sliding sheet 30 that is interposed between the base pad 29 and the fixing belt 21 reduces the sliding resistance of the fixing belt 21 against the base pad 29. In a case where the base pad 29 is a low-friction pad, the sliding sheet 30 may be omitted.

The stay 25 is a support that supports the nip formation pad 24 toward the pressure roller 22. The stay 25 supporting the nip formation pad 24 prevents the bending of the nip formation pad 24 (in particular, bending throughout the length of the fixing belt 21) under pressure from the pressure roller 22. Thus, the fixing nip N having a uniform width is obtained. The stay 25 is preferably made of an iron-based metal material such as steel use stainless (SUS) or steel electrolytic cold commercial (SECC) to enhance the rigidity.

The reflector 26 reflects radiant heat (infrared rays) emitted from the heaters 23. The reflector 26 reflects, to the fixing belt 21, the radiant heat emitted from the heaters 23 to efficiently heat the fixing belt 21. As the reflector 26 is interposed between the stay 25 and the heaters 23, the reflector 26 also prevents heat conduction to the stay 25. The reflector 26 thus prevents the flow of heat to a component that does not directly contribute to fixing, to enhance the efficiency of energy consumption. The reflector 26 is made of, for example, a metal material such as aluminum or stainless steel. In particular, in a case where the reflector 26 includes an aluminum base having a surface on which silver having a relatively high reflectance is deposited, the heating efficiency is further enhanced.

The belt holders 27 are a pair of rotator holders that holds the fixing belt 21 such that the fixing belt 21 can rotate. In other words, the fixing belt 21 is rotatably held by the belt holders 27. As illustrated in FIG. 3, the belt holders 27 are inserted into the loop formed by the fixing belt 21 at opposed longitudinal end portions of the fixing belt 21 to hold the inner side of the fixing belt 21 such that the fixing belt 21 can slidably rotate. Each of the "opposed longitudinal end portions" of the fixing belt 21 described above and the "longitudinal end portion" of the fixing belt 21 in the following description is not limited to a longitudinal edge of the fixing belt 21, which is the most end in the longitudinal direction of the fixing belt 21. Each of the "opposed longitudinal end portions" and the "longitudinal end portion" includes, in addition to the longitudinal edge of the fixing belt 21, a position within a range of one-third length from the longitudinal edge outside a minimum sheet conveyance area of the fixing belt 21 in the longitudinal direction of the fixing belt 21 when the fixing belt 21 is equally divided into three in the longitudinal direction of the fixing belt 21. Note that the minimum sheet conveyance area is an area in which a minimum sheet P is conveyable. In other words, the belt holder 27 may hold, as the longitudinal end portion of the fixing belt 21, an area not including the longitudinal edge of the fixing belt 21, in addition to an area including the longitudinal edge of the fixing belt 21.

Specifically, the belt holder 27 includes an insertion **27*a*, a restraint 27*b*, and a fixed portion 27*c*. The insertion 27*a* has a C-shaped cross-section and is inserted into the longitudinal end portion of the fixing belt 21. The restraint 27*b* has an outer diameter greater than that of the insertion 27*a*. The fixed portion 27*c* is fixed to a side plate 33 illustrated in FIG. 5. The restraint 27*b* has an outer diameter greater than that of at least the fixing belt 21 to restrain the deviation or movement of the fixing belt 21 in the longitudinal direction X. The insertion 27*a* is inserted into the longitudinal end portion of the fixing belt 21 to hold the inner side of the fixing belt 21 such that the fixing belt 21** can rotate.

The shield 31 is disposed or fixed between the heater 23 and the fixing belt 21 at each of the opposed longitudinal end portions of the fixing belt 21, with a gap between the shield 31 and the belt holder 27 and inwards from the belt holder 27, to shield the radiant heat (infrared rays) emitted from the heater 23. The shield 31 is disposed closer to the longitudinal end portion E than to the longitudinal center portion M of the fixing belt 21. Specifically, as illustrated in FIG. 5, the shield 31 is disposed in at least part of a non-sheet-conveyance area of the fixing belt 21 outside a maximum sheet conveyance area W of the fixing belt 21. The non-sheet-conveyance area of the fixing belt 21 is an area in which no sheet is conveyed, whereas the maximum sheet conveyance area W of the fixing belt 21 is an area in which a maximum sheet P is conveyable. The maximum sheet conveyance area W may be referred to as a maximum recording-medium conveyance area. Note that, in an image forming apparatus through which sheets in a single width pass, an area outside an area in which the sheets are conveyed is the non-sheet-conveyance area of the fixing belt. The shield 31 may be disposed at one of the opposed longitudinal end portions of the fixing belt 21, in particular, in a case where the sheets are conveyed simply at the other longitudinal end portion of the fixing belt 21.

Typically, in such a non-sheet-conveyance area, the sheets draw less heat from the fixing belt than in a sheet conveyance area in which the sheets are conveyed. In other words, the heat tends to be accumulated in the non-sheet-conveyance area. When multiple sheets are continuously conveyed and subjected to the fixing process, the amount of heat that is accumulated in the non-sheet-conveyance area of the fixing belt increases and may excessively increase the temperature of the non-sheet-conveyance area of the fixing belt. To prevent such a temperature rise in the non-conveyance area of the fixing belt 21, in the present embodiment, the shield 31 is disposed in at least part of the non-sheet-conveyance area of the fixing belt 21 where the temperature is likely to rise, to shield the radiant heat toward the non-sheet-conveyance area of the fixing belt 21. Although FIG. 5 illustrates the shield 31 disposed at one longitudinal end portion of the fixing belt 21, the shield 31 is disposed at each of the opposed longitudinal end portions of the fixing belt 21.

The temperature sensor 28 is a temperature detector that detects the temperature of the fixing belt 21. In the present embodiment, the temperature sensor 28 is a non-contact temperature sensor that is disposed so as not to contact the outer circumferential surface of the fixing belt 21. In this case, the temperature sensor 28 detects the ambient temperature near the outer circumferential surface of the fixing belt 21 as the surface temperature of the fixing belt 21. The temperature sensor 28 is not limited to a non-contact sensor. Alternatively, the temperature sensor 28 may be a contact sensor that contacts the fixing belt 21 to detect the surface temperature of the fixing belt 21. The temperature sensor 28 may be, for example, a thermopile, a thermostat, a thermistor, or a normally closed (NC) sensor.

The fixing device 20 according to the present embodiment operates as follows.

As the pressure roller 22 is rotated in a direction indicated by an arrow in FIG. 2 by driving of a driving source disposed in the body of the image forming apparatus 100, the fixing belt 21 is rotated by the rotation of the pressure roller 22. The heaters 23 generate heat to heat the fixing belt 21. At this time, the amount of heat to be generated by the heaters 23 is controlled based on the temperature of the fixing belt 21 detected by the temperature sensor 28 to achieve a given fixing temperature of the fixing belt 21 at which an image can be fixed. When the temperature of the fixing belt 21 reaches the fixing temperature and the sheet P bearing an unfixed image reaches the fixing nip N between the fixing belt 21 and the pressure roller 22, the fixing belt 21 and the pressure roller 22 apply heat and pressure to the sheet P to fix the image onto the sheet P.

In a fixing device including a nip formation pad such as the nip formation pad 24 described above, when a fixing belt rotates, the fixing belt slides over the nip formation pad and generates sliding resistance between the fixing belt and the nip formation pad. To reduce such sliding resistance, a lubricant such as silicone oil or fluorine grease is typically applied so as to be interposed between the fixing belt and the nip formation pad. For example, in the present embodiment, a lubricant 80 is contained in the sliding sheet 30 disposed between the base pad 29 of the nip formation pad 24 and the inner circumferential surface of the fixing belt 21 as illustrated in FIG. 2. As the lubricant 80 oozes out from the sliding sheet 30, the lubricant 80 is interposed between the nip formation pad 24 and the fixing belt 21. In the configuration in which the fixing belt 21 is held by the pair of belt holders 27 as described above, when the fixing belt 21 rotates, the fixing belt 21 slides over each of the belt holders 27. At this time, the sliding resistance is also generated between each of the belt holders 27 and the fixing belt 21. To reduce the sliding resistance, the lubricant 80 as described above is also interposed between each of the belt holders 27 and the fixing belt 21 as illustrated in FIG. 4.

In a configuration including slide aids such as the nip formation pad and the belt holders over which the fixing belt slides, a lubricant such as silicone oil or fluorine grease is typically used to enhance the slidability of the fixing belt. However, when some components of the lubricant are volatilized with an increase in the temperature of the fixing device and aggregated by being cooled in the atmosphere, fine particles (FP) and ultrafine particles (UFP) are generated and may be released from the fixing device. In the following description, the fine particles and the ultrafine particles may be referred to simply as FP/UFP.

Currently, due to an increase in the awareness of environmental issues, the reduction of FP/UFP discharged from products has been desired. The image forming apparatuses that reduce the generation of FP/UFP are also to be developed.

In view of the above, to consider how to reduce the generation of FP/UFP from the fixing devices, the inventors conducted a test to examine the relation between the temperature rise of silicone oil and fluorine grease used as lubricants and the concentration of FP/UFP generated from the lubricants (the number of FP/UFP generated per 1 cm 3).

Figure 16:
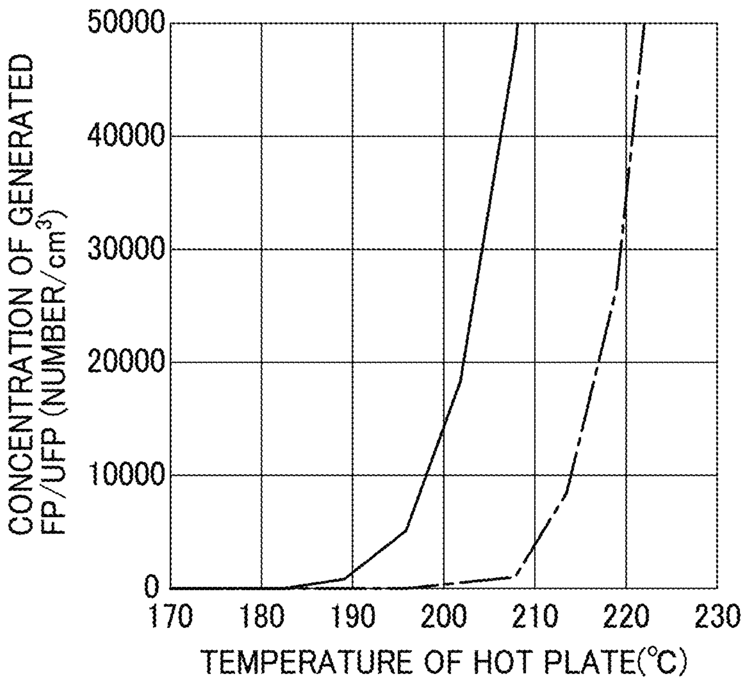
FIG. 16 is a graph illustrating an example relation between the temperature of a lubricant and the concentration of generated fine particles and ultrafine particles.

FIG. 16 illustrates the results.

This test was performed in a test apparatus (a chamber having a volume of 1 m 3 and a ventilating frequency of 5 times) installed in a laboratory certified by the German environmental label "Blue Angel." Specifically, a dish containing a lubricant is placed on a hot plate and heated to 250° C. While the temperature of the hot plate was monitored, the concentration of generated FP/UFP having a diameter of 5.6 nm to 560 nm specified by the Blue Angel standard was measured. The concentration of generated FP/UFP was measured with a particle sizer (Model 3091 FAST MOBILITY PARTICLE SIZER (FMPS), Tokyo Dylec Corp.). A fluorine grease of 70 mg and a silicone oil of 35 mg were used as lubricants. In FIG. 16, the solid line indicates the concentration of FP/UFP generated from the fluorine grease, whereas the alternate long and short dash line indicates the concentration of FP/UFP generated from the silicone oil. In FIG. 16, the horizontal axis indicates the temperature of the hot plate. Since the temperature rise of the hot plate and the temperature rise of the lubricant change substantially in synchronization with each other, the temperature of the hot plate is regarded as the temperature of the lubricant here.

As indicated by the solid line in FIG. 16, the generation of FP/UFP from the fluorine grease started when the temperature reached about 185° C. The concentration of FP/UFP generated from the fluorine grease started rapidly increasing when the temperature exceeded about 195° C. On the other hand, as indicated by the alternate long and short dash line in FIG. 16, the generation of FP/UFP from the silicone oil started when the temperature reached about 200° C. The concentration of FP/UFP generated from the silicone oil started rapidly increasing when the temperature exceeded about 210° C.

As described above, since the FP/UFP are generated from the fluorine grease and the silicone oil when the temperature reaches 185° C. and 200° C., respectively, the FP/UFP may be generated from the lubricant in the fixing device in which the temperature can exceed 200° C. To effectively reduce such FP/UFP, a temperature rise in a portion of the fixing device where FP/UFP are likely to be generated is to be prevented.

However, the portion of the fixing device from which the FP/UFP are mostly generated has not been specified. For this reason, the inventors have conducted intensive studies on a main source that generates the FP/UFP. As a result, the inventors have found that a large amount of FP/UFP is generated mainly from the lubricant adhering to the belt holder. A description is now given of the mechanism of generation of FP/UFP and the reason why a large amount of FP/UFP is generated mainly from the lubricant adhering to the belt holder.

Figure 17:
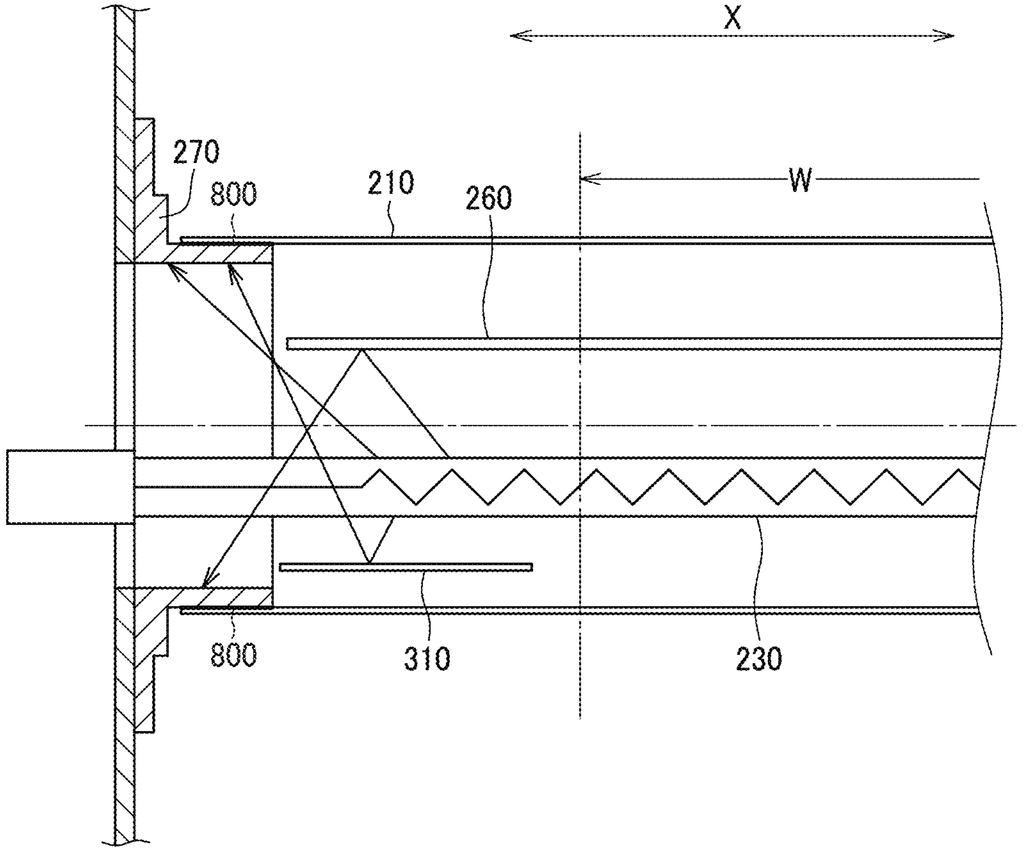
FIG. 17 RELATED ART
FIG. 17 is a cross-sectional view of an end portion of a fixing device according to a comparative example, taken along a longitudinal direction of a fixing belt included in the fixing device.

FIG. 17 is a cross-sectional view of an end portion of a fixing device according to a comparative example, taken along the longitudinal direction X of a fixing belt 210 included in the fixing device.

As illustrated in FIG. 17, the fixing device according to the comparative example includes a belt holder 270 that holds a longitudinal end portion of the fixing belt 210, like the fixing device according to the embodiment described above. Inside the fixing belt 210 are a reflector 260 that reflects radiant heat emitted from a heater 230 and a shield 310 that shields the radiant heat emitted from the heater 230.

In FIG. 17, arrows schematically indicate part of the radiant heat (infrared rays) emitted from the heater 230. As illustrated in FIG. 17, when the radiant heat is emitted from the heater 230, the belt holder 270 is directly irradiated with part of the radiant heat. On the other hand, part of the radiant heat is reflected by the reflector 260 and the shield 310 and reaches the belt holder 270. In short, the belt holder 270 is indirectly irradiated with part of the radiant heat. As the belt holder 270 is heated by the radiant heat directly emitted from the heater 230 and the radiant heat reflected by the reflector 260 and the shield 310, the temperature of the belt holder 270 rises. In particular, when multiple sheets are continuously conveyed, the temperature rise is remarkable at opposed longitudinal end portions of the fixing belt 210 because the opposed longitudinal end portions of the fixing belt 210 are non-conveyance areas of the fixing belt 210 in which no sheet is conveyed. For this reason, the temperature of the belt holder 270 that holds each of the opposed longitudinal end portions of the fixing belt 210 is also likely to rise under the influence of the heat of the fixing belt 210.

A lubricant 800 is applied on an outer circumferential surface of the belt holder 270 to reduce the sliding resistance of the fixing belt 210. In a case where the lubricant 800 is not actively applied on the outer circumferential surface of the belt holder 270, a lubricant interposed between the fixing belt 210 and a nip formation pad may flow with the rotation of the fixing belt 210 and adhere to the outer circumferential surface of the belt holder 270.

When the temperature of the belt holder 270 rises and exceeds the temperature at which the FP/UFP are generated, due to the influences of the radiant heat emitted directly to the belt holder 270 from the heater 230 and the radiant heat reflected by the reflector 260 and the shield 310, in addition to the influence of the temperature rise at the opposed longitudinal end portions of the fixing belt 210 as described above, some low-molecular-weight components of the lubricant 800 adhering to the belt holder 270 are volatilized and aggregated when cooled in the atmosphere. Thus, the FP/UFP are released. As described above, in the fixing device according to the comparative example, the radiant heat emitted directly to the belt holder 270 from the heater 230 and the radiant heat reflected by the reflector 260 and the shield 310 cause the temperature rise of the belt holder 270, as one of the factors of generating the FP/UFP.

By contrast, in the embodiment illustrated in FIG. 5, the reflectance of the shield 31 is lower than the reflectance of the reflector 26 to reduce the temperature rise of the belt holder 27.

In addition, in the present embodiment, the reflectance of the shield 31 is lower than the reflectance of the belt holder 27. In the present embodiment, reflectances Ra, Rb, and Rc satisfy a relation of $Ra<Rb<Rc$, where Ra represents the reflectance of the shield 31, Rb represents the reflectance of the belt holder 27, and Rc represents the reflectance of the reflector 26. This relation of the reflectances is satisfied among the reflector 26, the belt holders 27, and the shields 31 disposed at the opposed longitudinal end portions of the fixing belt 21.

The reflectance of each of the shield 31, the belt holder 27, and the reflector 26 is specifically the reflectance at a portion of each of these components irradiated with the radiant heat from the heater 23. As illustrated in FIG. 5, the shield 31 has a face 311 facing the heater 23. The reflector 26 has a face 261 facing the heater 23. The belt holder 27 has an inner circumferential face 271. Specifically, in the present embodiment, the face 311 of the shield 31, the face 261 of the reflector 26, and the inner circumferential face 271 of the belt holder 27 are faces irradiated with the radiant heat. The reflectance herein refers to a reflectance measured at an incident angle of 5° with a spectrophotometer (ultraviolet-visible infrared spectrophotometer UH4150 manufactured by Hitachi High-Tech Science Corporation).

As described above, in the present embodiment, the reflectance of the shield 31 that is disposed at the longitudinal end portion of the fixing belt 21 with a gap between the shield 31 and the fixing belt 21 is lower than the reflectance of the reflector 26. Accordingly, the radiant heat that is reflected by the shield 31 is reduced while ensuring the radiant heat from the reflector 26 to the longitudinal center portion of the fixing belt 21. Since the radiant heat emitted to, for example, the inner circumferential surface of the belt holder 27 disposed at the longitudinal end portion of the fixing belt 21 is reduced, the heat conduction from a portion of the belt holder 27 close to the reflector 26 to a portion of the belt holder 27 close to the fixing belt 21 is also reduced. When part of the heat of the shield 31 is conducted to the fixing belt 21 by the air in the gap and the heat that is thus conducted to the fixing belt 21 is further conducted to the belt holder 27, the temperature rise of the belt holder 27 is reduced.

Halogen heaters that are used as heating sources have different color temperatures depending on the application. A halogen heater having a color temperature of about 2500K is typically used for heating in the fixing device. For this reason, the relation between the reflectances of the shield 31, the belt holder 27, and the reflector 26 as described above is preferably a relation between the reflectances in a wavelength range of a halogen heater having a relatively high emission intensity, specifically, a wavelength range of 900 nm to 1600 nm, and more preferably, a wavelength range of 1000 nm to 1300 nm.

As the reflectance of the shield 31 decreases, the reflection of the radiant heat is further reduced. To reduce the reflection of the radiant heat from the shield 31 and effectively reduce the temperature rise of the belt holder 27, the difference between the reflectance of the shield 31 and the reflectance of the belt holder 27 is preferably not less than 10%.

Figure 6:
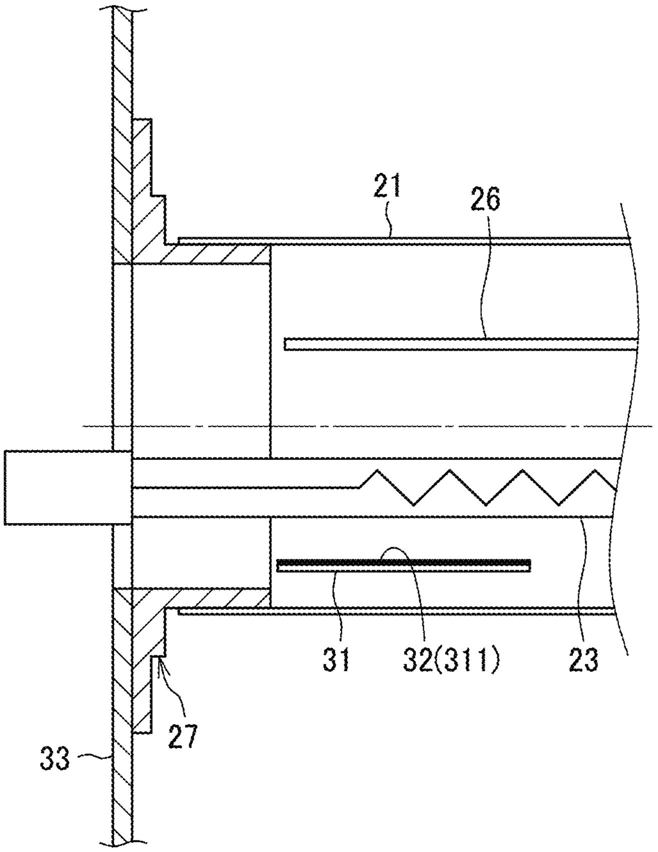
FIG. 6 is a diagram illustrating a configuration of the fixing device of FIG. 2 to decrease the reflectance of a shield included in the fixing device.

One approach to the reduction in the reflectance of the shield 31 involves providing the face 311, facing the heater 23 and irradiated with the radiant heat, of the shields 31 with a black surface layer 32 made of black material or paint, as illustrated in FIG. 6. Another approach involves providing the surface roughness of the face 311 of the shield 31 greater than the surface roughness of the face 261 of the reflector 26 or the face 271 of the belt holder 27. In other words, the surface of the face 311 of the shield 31 is rougher than the surface of the face 261 of the reflector 26 or the surface of the face 271 of the belt holder 27. As described above, the face 311 of the shield 31, the face 261 of the reflector 26, and the face 271 of the belt holder 27 are the faces irradiated with the radiant heat.

On the other hand, the belt holder 27 preferably has a relatively high reflectance, contrary to the shield 31, to reduce a temperature rise. For this reason, in the present embodiment, the reflectance of the belt holder 27 is higher than the reflectance of the shield 31.

Figure 7:
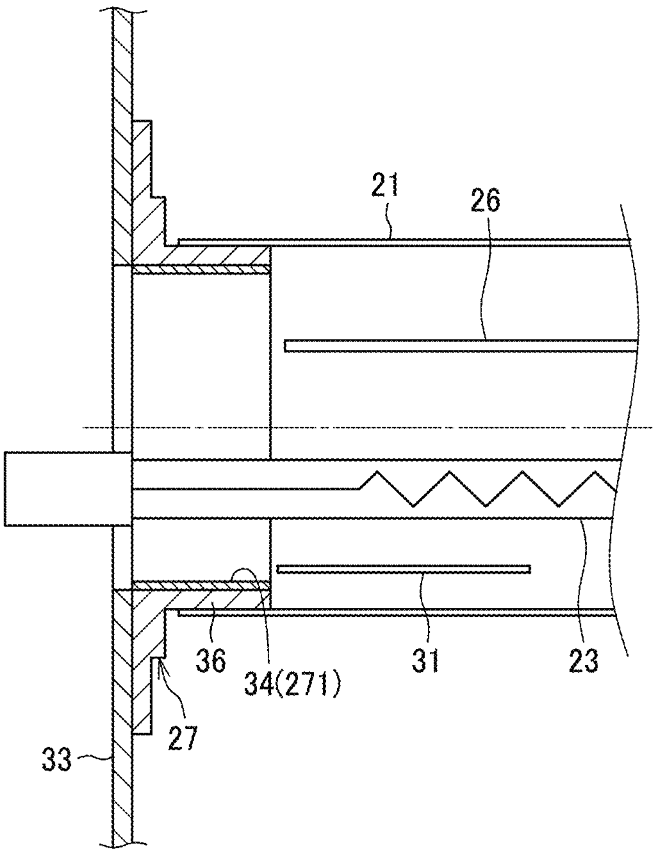
FIG. 7 is a diagram illustrating a configuration of the fixing device of FIG. 2 to increase the reflectance of a belt holder included in the fixing device.

For example, in a case where the belt holder 27 is made of a resin material having a relatively low reflectance, a metal layer 34 having a reflectance higher than that of resin may rest on an inner circumferential surface of a resin base 36 of the belt holder 27, as illustrated in FIG. 7. Such a configuration enhances the reflectance of the inner circumferential face 271 (i.e., the face irradiated with the radiant heat) of the belt holder 27. Although the reflectance of the belt holder 27 is higher than the reflectance of the shield 31 in the present embodiment, the reflectance of the belt holder 27 may be equal to or lower than the reflectance of the shield 31 in another embodiment.

As described above, in the present embodiment, the reflectance of the shield 31 is decreased to reduce the radiant heat reflected to the belt holder 27. On the other hand, the amount of heat that is absorbed by the shield 31 increases. In other words, the temperature of the shield 31 may easily rise. Although shields are typically made of a heat-resistant material, some measures are preferably taken so that the temperature of the shields does not exceed the heat-resistant temperature of the shields.

Figure 8:
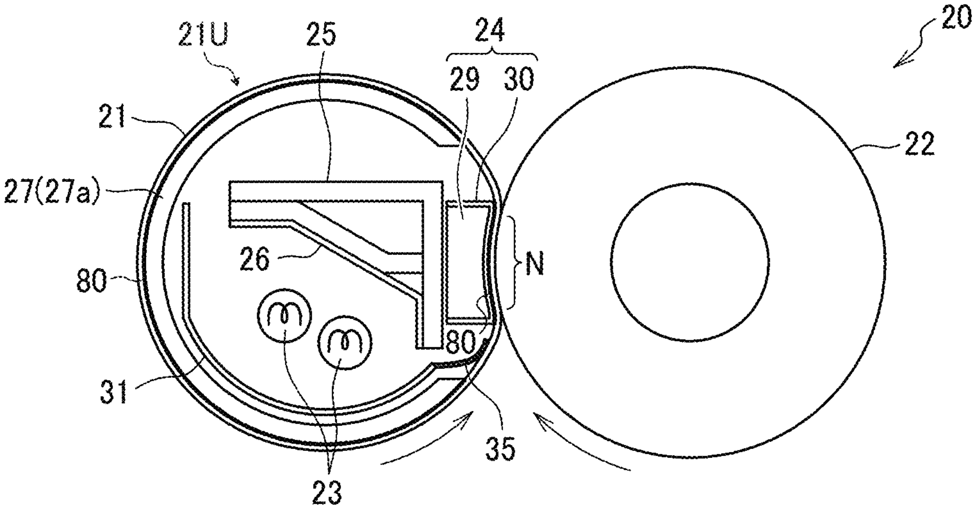
FIG. 8 is a cross-sectional view of an end portion of a fixing device according to another embodiment of the present disclosure.

For example, as illustrated in FIG. 8, a heat conductor 35 having good thermal conductivity may be disposed on the shield 31 such that the heat conductor 35 is in contact with the inner circumferential surface of the fixing belt 21, preferably, the inner circumferential surface of the fixing belt 21 closer to the longitudinal center portion of the fixing belt 21 than the shield 31. In this case, the shield 31 is in indirect contact with the inner circumferential surface of the fixing belt 21 via the heat conductor 35. Since the heat of the shield 31 moves to the fixing belt 21 via the heat conductor 35, the temperature rise of the shield 31 is reduced. Further, in this case, since the heat of the shield 31 is effectively utilized as the heating energy for the fixing belt 21, an energy-saving effect is also expected. The heat conductor 35 is preferably a flexible component such as a felt having thermal conductivity or a metal brush so as not to damage the inner circumferential surface of the fixing belt 21. In a case where the shield 31 is made of a material having good thermal conductivity, the shield 31 may be in direct contact with the inner circumferential surface of the fixing belt 21.

Figure 9:
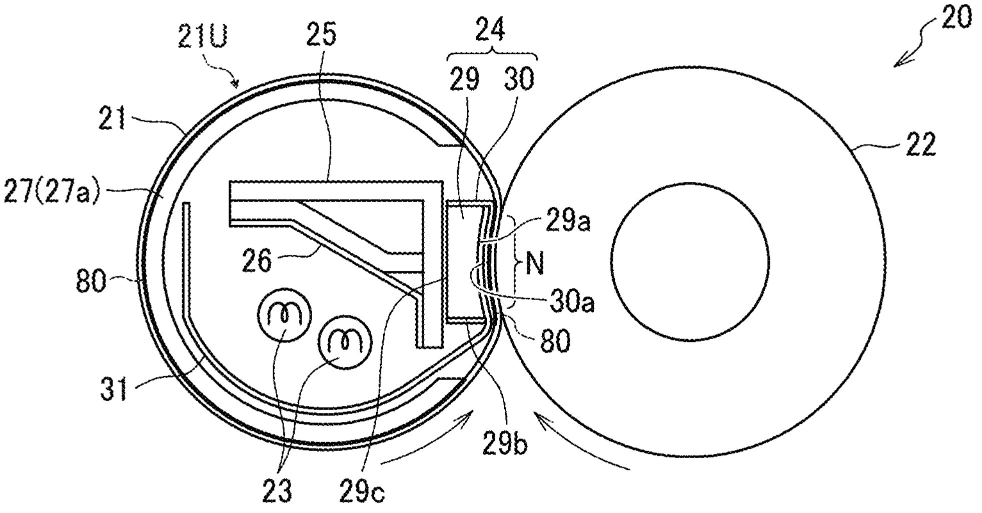
FIG. 9 is a cross-sectional view of an end portion of a fixing device according to yet another embodiment of the present disclosure.

Alternatively, as illustrated in FIG. 9, the shield 31 may be in contact with the nip formation pad 24 to reduce the temperature rise of the shield 31. In the embodiment illustrated in FIG. 9, the shield 31 is interposed between a face **29*a* of the base pad 29 of the nip formation pad 24 and a face 30*a* of the sliding sheet 30 of the nip formation pad 24 while being in contact with the face 29*a* of the base pad 29 and the face 30*a* of the sliding sheet 30. The face 29*a* of the base pad 29 is a surface facing the fixing nip N whereas the face 30*a* of the sliding sheet 30 faces the face 29*a* of the base pad 29. In this case, since the heat of the shield 31 moves to the nip formation pad 24, the temperature rise of the shield 31 is reduced while the heat of the shield 31 is supplied to the fixing belt 21 via the nip formation pad 24** to be effectively utilized as the heat for fixing an image on a sheet.

Figure 10:
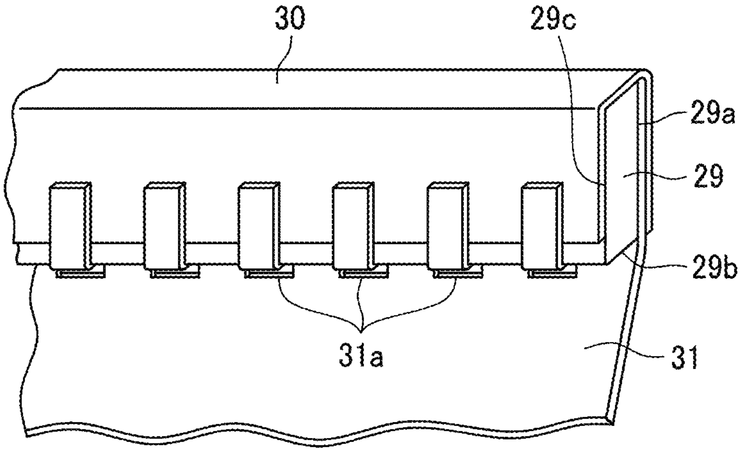
FIG. 10 is a view of an example shield having holes through which a sliding sheet passes.

Alternatively, as illustrated in FIG. 10, the shield 31 may have a plurality of holes **31*a* through which the sliding sheet 30 passes, to fix the sliding sheet 30 at a side face 29*b* of the base pad 29 or a back face 29*c* of the base pad 29. The side face 29*b* is a surface intersecting the face 29*a* of the base pad 29 whereas the back face 29*c* is a surface facing away from the fixing nip N. In short, the face 29*a* and the back face 29*c* are opposite faces of the base pad 29. The sliding sheet 30 is disposed from the face 29*a* of the base pad 29 to the side face 29*b* or the back face 29*c* through the holes 31*a*. Thus, the sliding sheet 30 is fixed at the side face 29*b* or the back face 29*c* of the base pad 29**.

As described above, in the fixing device according to the embodiments of the present disclosure, a decreased reflectance of the shield reduces the radiant heat reflected to the belt holder, thus reducing the temperature rise of the belt holder. Accordingly, the temperature rise of the lubricant adhering to the belt holder is reduced, resulting in the reduction of FP/UFP that are generated when some low-molecular-weight components of the lubricant are volatilized and aggregated by being cooled in the atmosphere.

Specifically, when the temperature of the belt holder during 10 minutes of continuous printing is equal to or lower than 210° C., which is a temperature at which the FP/UFP derived from the silicone oil starts rapidly increasing as indicated by the alternate long and short dash line in the graph of FIG. 16, the generation of FP/UFP from the silicone oil is reduced. To reduce the generation of FP/UFP from the silicone oil more effectively, the temperature of the belt holder during 10 minutes of continuous printing is preferably reduced to 200° C. or lower.

When the temperature of the belt holder during 10 minutes of continuous printing remains equal to or lower than 195° C., which is a temperature at which the FP/UFP derived from the fluorine grease starts rapidly increasing as indicated by the solid line in the graph of FIG. 16, the generation of FP/UFP from the silicone oil and the fluorine grease is reduced. To reduce the generation of FP/UFP from the fluorine grease more effectively, the temperature of the belt holder during 10 minutes of continuous printing is preferably reduced to 185° C. or lower.

The "temperature of the belt holder during 10 minutes of continuous printing" is the temperature of the belt holder measured by the following procedure. In the procedure of the temperature measurement, first, an image forming apparatus including a fixing device (or heating device) is installed in a measurement room in an environment of 23° C. After the power of the image forming apparatus is turned on to start up the image forming apparatus and the image forming apparatus shifts to an energy-saving state, the door of the measurement room is closed. The printing is instructed after a lapse of time (for example, 60 minutes) during which the measurement room is sufficiently ventilated. Then, the temperature of the belt holder is measured for 10 minutes with the time when the first sheet is ejected as the start of printing.

Since the temperature rise of the belt holder as a factor of generating the FP/UFP is more remarkable in the image forming apparatus in which the number of sheets conveyed per unit time is larger, a great effect is expected when the embodiments of the present disclosure are applied particularly to the image forming apparatus in which a large number of sheets can be conveyed.

Figure 11:
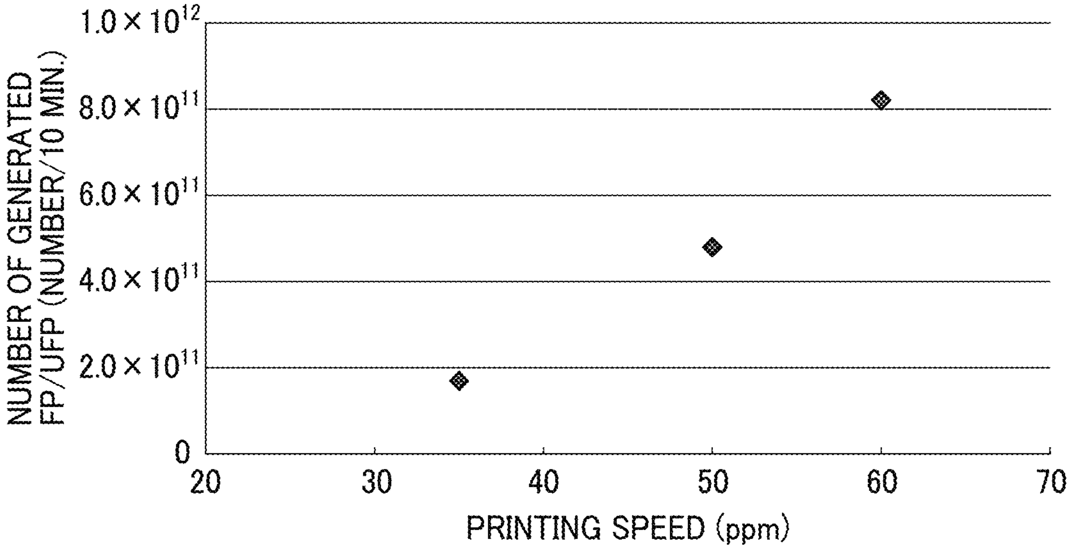
FIG. 11 is a graph illustrating an example relation between the printing speed and the number of generated fine particles and ultrafine particles.

FIG. 11 illustrates an example relation between the printing speed and the number of generated FP/UFP.

In FIG. 11, the number of FP/UFP generated from the fixing device during 10 minutes of continuous printing becomes particularly large when the printing speed exceeds 50 pages per minute (ppm). Thus, when the embodiments of the present disclosure are applied to a fixing device or an image forming apparatus having a printing speed equal to or greater than 50 ppm, a greater effect is expected.

Although the fluorine grease and the silicone oil are used as the substances that generate the FP/UFP in the above embodiments, another liquid or semi-solid lubricating substance (i.e., liquid or semi-solid substance having lubricity) besides the fluorine grease and the silicone oil may be used in another embodiment of the present disclosure. In the embodiments of the present disclosure, the lubricating substance (i.e., the substance having lubricity) refers to a substance that is interposed between components to reduce frictional resistance between the components. Even in a case where another liquid or semi-solid lubricating substance besides the fluorine grease and the silicone oil is contained in the fixing device, according to the embodiments of the present disclosure, the temperature rise of the belt holder is reduced while the temperature rise of the lubricating substance adhering to the belt holder is also reduced. Thus, the generation of FP/UFP is effectively reduced.

According to the embodiments of the present disclosure, the configuration of the fixing device is not limited to the configurations described above. The embodiments of the present disclosure can be applied to fixing devices having various configurations. A description is now given of some examples of the configuration of the fixing device to which the embodiments of the present disclosure are applicable.

Figure 12:
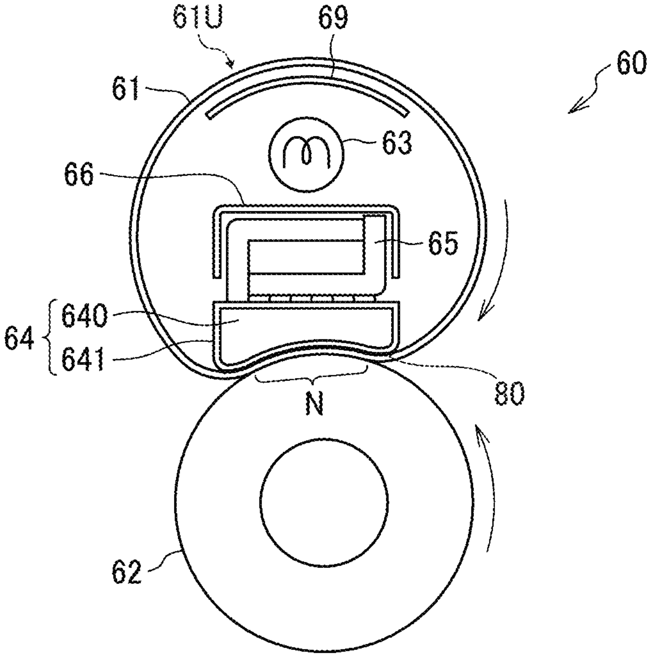
FIG. 12 is a cross-sectional view of a fixing device according to a modification of the above embodiments.
Figure 13:
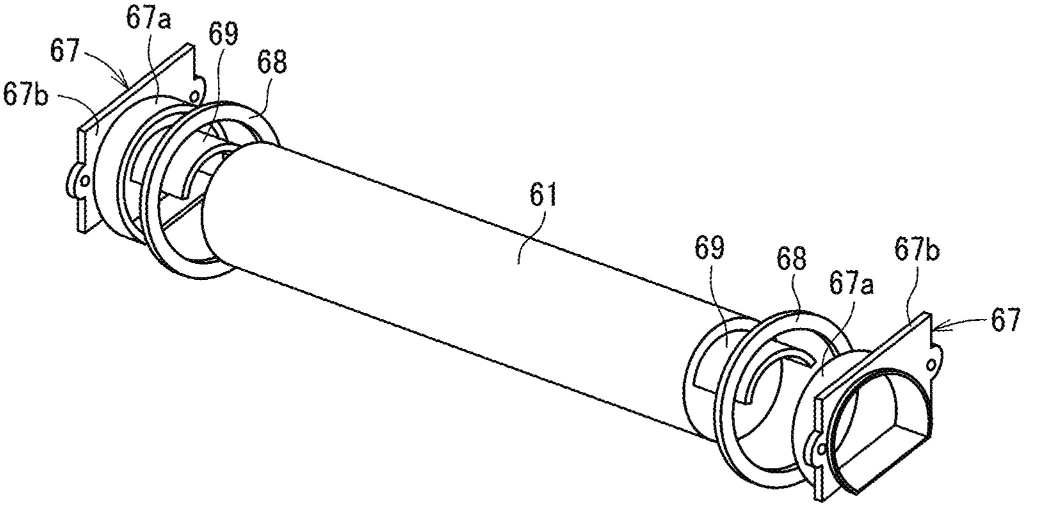
FIG. 13 is an exploded perspective view of the fixing device illustrated in FIG. 12.

A fixing device 60 that is illustrated in FIGS. 12 and 13 is a fixing device including a halogen heater (i.e., a heater 63) as a heating source, like the fixing device 20 illustrated in FIGS. 2 to 5. Specifically, the fixing device 60 that is illustrated in FIGS. 12 and 13 includes a fixing belt 61, a pressure roller 62, the heater 63, a nip formation pad 64, a stay 65, a reflector 66, belt holders 67 (see FIG. 13), sliding rings 68 (see FIG. 13), and shields 69. The fixing belt 61 and the components disposed inside a loop formed by the fixing belt 61 constitute a belt unit 61U, which is detachably coupled to the pressure roller 62.

The fixing belt 61, the pressure roller 62, the heater 63, the nip formation pad 64, the stay 65, the reflector 66, the belt holders 67, and the shields 69 that are illustrated in FIGS. 12 and 13 are basically the same in function and configuration as the fixing belt 21, the pressure roller 22, the heater 23, the nip formation pad 24, the stay 25, the reflector 26, the belt holders 27, and the shields 31, respectively, illustrated in FIGS. 2 to 5. The nip formation pad 64 includes a metal base pad 640 and a fluororesin sliding sheet 641 that is interposed between the base pad 640 and an inner circumferential surface of the fixing belt 61.

The sliding ring 68 is mounted on an outer circumferential surface of an insertion 67*a* of the belt holder 67, which is inserted into the loop formed by the fixing belt 61. The sliding ring 68 is interposed between a longitudinal edge of the fixing belt 61 and a restraint 67*b* of the belt holder 67. As the fixing belt 61 rotates, the sliding ring 68 rotates together with the fixing belt 61, or the fixing belt 61 slides over the low-friction sliding ring 68. Thus, the sliding resistance that is generated between the fixing belt 61 and the belt holder 67 is reduced.

As described above, in the fixing device 60 illustrated in FIGS. 12 and 13, the shields 69 are disposed in addition to the reflector 66 that reflects the radiant heat emitted from the heater 63. When the belt holder 67 is irradiated with the radiant heat reflected by the reflector 66 and the shield 69, the temperature of the belt holder 67 rises. Such a temperature rise of the belt holder 67 increases the temperature of the lubricant 80 adhering to the belt holder 67. As a result, some low-molecular-weight components of the lubricant 80 may be volatilized and aggregated when cooled in the atmosphere. Thus, the FP/UFP may be generated. To reduce the generation of FP/UFP, as in the fixing device 20 described above, the reflectance of the shield 69 is preferably lower than the reflectance of the reflector 66 in the fixing device 60. Such a configuration reduces the radiant heat emitted to the belt holder 67 and the temperature rise of the belt holder 67. Accordingly, the generation of FP/UFP is reduced.

Figure 14:
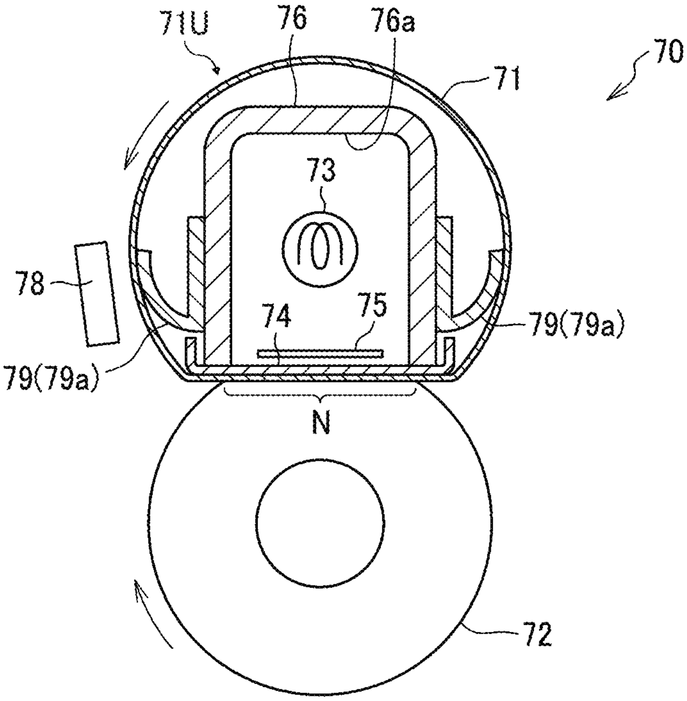
FIG. 14 is a cross-sectional view of a fixing device according to another modification of the above embodiments.
Figure 15:
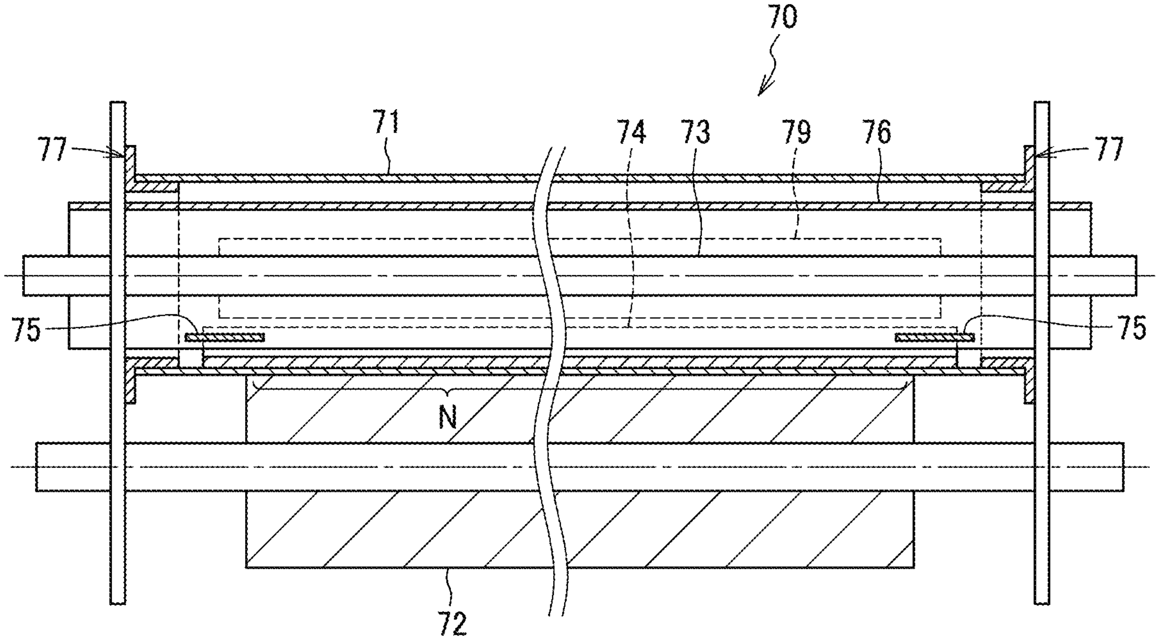
FIG. 15 is a cross-sectional view of the fixing device illustrated in FIG. 14, taken along a longitudinal direction of a fixing belt included in the fixing device.

A fixing device 70 that is illustrated in FIGS. 14 and 15 is a fixing device including a halogen heater (i.e., a heater 73) as a heating source, like the fixing device 20 illustrated in FIGS. 2 to 5. Specifically, the fixing device 70 that is illustrated in FIGS. 14 and 15 includes a fixing belt 71, a pressure roller 72, the heater 73, a nip formation pad 74, a reflector 76, belt holders 77 (see FIG. 15), shields 75, a temperature sensor 78 (see FIG. 14), and guides 79. The fixing belt 71 and the components disposed inside a loop formed by the fixing belt 71 constitute a belt unit 71U, which is detachably coupled to the pressure roller 72.

The fixing belt 71, the pressure roller 72, the heater 73, the nip formation pad 74, the reflector 76, the belt holders 77, the shields 75, and the temperature sensor 78 that are illustrated in FIGS. 14 and 15 are basically the same in function as the fixing belt 21, the pressure roller 22, the heater 23, the nip formation pad 24, the reflector 26, the belt holders 27, the shields 31, and the temperature sensor 28, respectively, illustrated in FIGS. 2 to 5.

Unlike the reflector 26 that reflects the radiant heat emitted from the heater 23 to the fixing belt 21 in the fixing device 20, the reflector 76 that is illustrated in FIGS. 14 and 15 reflects the radiant heat (infrared rays) emitted from the heater 73 mainly to the nip formation pad 74, not to the fixing belt 71. The reflector 76 has a U-shaped cross-section to cover the outside of the heater 73. The reflector 76 has an inner face 76*a* facing the heater 73 and serving as a reflecting surface having a relatively high reflectance. When the radiant heat is emitted from the heater 73, the inner face 76*a* as a reflecting surface of the reflector 76 reflects the radiant heat to the nip formation pad 74.

As a result, the nip formation pad 74 is heated by the radiant heat emitted from the heater 73 toward the nip formation pad 74 and the radiant heat reflected by the reflector 76 to the nip formation pad 74. The heat is conducted from the nip formation pad 74 to the fixing belt 21 at the fixing nip N. In this case, the nip formation pad 74 that forms the fixing nip N functions as a heat conductor that conducts heat to the fixing belt 71 at the fixing nip N. To conduct heat, the nip formation pad 74 is made of a metal material having good thermal conductivity such as copper or aluminum.

The reflector 76 also functions as a support (stay) that supports the nip formation pad 74. Since the reflector 76 supports the nip formation pad 74 throughout the length of the fixing belt 71, the bending of the nip formation pad 74 is prevented and the fixing nip N having a uniform width is formed between the fixing belt 71 and the pressure roller 72. The reflector 76 is preferably made of a metal material having relatively high rigidity such as SUS or SECC to ensure the function as a support.

The guides 79 are disposed inside the loop formed by the fixing belt 71 to guide the rotatable fixing belt 71 from the inside. Each of the guides 79 has a guide face 79*a* curving along an inner circumferential surface of the fixing belt 71. As the fixing belt 71 is guided along the guide face 79*a*, the fixing belt 71 smoothly rotates without being largely deformed.

Like the fixing devices described above, the fixing device 70 that is illustrated in FIGS. 14 and 15 includes the shields 75 in addition to the reflector 76 that reflects the radiant heat emitted from the heater 73. When the belt holder 77 is irradiated with the radiant heat reflected by the reflector 76 and the shield 75, the temperature of the belt holder 77 may rise and the FP/UFP may be generated from the lubricant 80 adhering to the belt holder 77. To reduce the generation of FP/UFP, as in the fixing devices described above, the reflectance of the shield 75 is preferably lower than the reflectance of the reflector 76 in the fixing device 70. Such a configuration reduces the radiant heat emitted to the belt holder 77 and the temperature rise of the belt holder 77. Accordingly, the generation of FP/UFP is reduced.

The embodiments described above are applied to the fixing device included in the electrophotographic image forming apparatus. However, one or more embodiments of the present disclosure may be applied to a heating device other than the fixing device, such as a drying device that is included in an inkjet image forming apparatus and dries liquid such as ink applied to a sheet.

The embodiments described above are given by way of example, and unique advantageous effects are achieved for each of the following aspects given below.

According to a first aspect, a heating device includes a rotator, a heating source, a reflector, a shield, a rotator holder, and a liquid or semi-solid substance. The rotator is rotatably held. The heating source heats the rotator. The reflector reflects radiant heat emitted from the heating source. The shield is disposed closer to a longitudinal end portion of the rotator than to a longitudinal center portion of the rotator to shield, between the heating source and the rotator, the radiant heat emitted from the heating source. The rotator holder holds the longitudinal end portion of the rotator. The liquid or semi-solid substance has lubricity and adheres to the rotator holder. The shield has a reflectance lower than a reflectance of the reflector.

According to a second aspect, in the heating device of the first aspect, the rotator holder has a reflectance lower than the reflectance of the reflector, and the reflectance of the shield is lower than the reflectance of the rotator holder.

According to a third aspect, in the heating device of the second aspect, the reflectance of the shield and the reflectance of the rotator holder have a difference of not less than 10%.

According to a fourth aspect, in the heating device of any one of the first to third aspects, the reflectance is a reflectance in a wavelength range of the radiant heat.

According to a fifth aspect, in the heating device of any one of the first to fourth aspects, the shield is in contact with the rotator.

According to a sixth aspect, the heating device of any one of the first to fourth aspects further includes a nip formation pad disposed inside a loop formed by the rotator to form a nip between the rotator and a counter rotator that contacts an outer circumferential surface of the rotator. The shield is in contact with the nip formation pad.

According to a seventh aspect, in the heating device of any one of the first to sixth aspects, the shield has a black face irradiated with the radiant heat.

According to an eighth aspect, in the heating device of any one of the first to seventh aspects, the rotator holder has a metal face irradiated with the radiant heat.

According to a ninth aspect, in the heating device of any one of the first to eighth aspects, each of the shield, the reflector, and the rotator holder includes a face irradiated with the radiant heat, and the face of the shield has a surface roughness greater than a surface roughness of the face of the reflector or a surface roughness of the face of the rotator holder.

According to a tenth aspect, in the heating device according to any one of the first to ninth aspects, wherein the substance having lubricity includes at least one of silicone oil and fluorine grease.

According to an eleventh aspect, a fixing device includes the heating device of any one of the first to tenth aspects and a counter rotator that contacts an outer circumferential surface of the rotator of the heating device, to heat a recording medium bearing an unfixed image and fix the unfixed image onto the recording medium. According to a twelfth aspect, an image forming apparatus includes the heating device of any one of the first to tenth aspects or the fixing device of the eleventh aspect.

According to one aspect of the present disclosure, the generation of fine particles and ultrafine particles is reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device, comprising:
a rotator rotatably held;
a heating source configured to heat the rotator;
a reflector configured to reflect radiant heat emitted from the heating source;
a shield disposed closer to a longitudinal end portion of the rotator than to a longitudinal center portion of the rotator to shield, between the heating source and the rotator, the radiant heat emitted from the heating source,
the shield having a reflectance lower than a reflectance of the reflector;
a rotator holder holding the longitudinal end portion of the rotator; and
a liquid or semi-solid substance having lubricity and adhering to the rotator holder,
wherein the rotator holder has a reflectance lower than the reflectance of the reflector;
wherein the reflectance of the shield is lower than the reflectance of the rotator holder, and
wherein the reflectance of the shield and the reflectance of the rotator holder have a difference of not less than 10%.

2. The heating device according to claim 1,
wherein the reflectance is a reflectance in a wavelength range of the radiant heat.

3. The heating device according to claim 1,
wherein the shield is in contact with the rotator.

4. The heating device according to claim 1, further comprising a nip formation pad disposed inside a loop formed by the rotator to form a nip between the rotator and a counter rotator that contacts an outer circumferential surface of the rotator,
wherein the shield is in contact with the nip formation pad.

5. The heating device according to claim 1,
wherein the shield has a black face irradiated with the radiant heat.

6. The heating device according to claim 1,
wherein the rotator holder has a metal face irradiated with the radiant heat.

7. The heating device according to claim 1, wherein each of the shield, the reflector, and the rotator holder includes a face irradiated with the radiant heat, and wherein the face of the shield has a surface roughness greater than a surface roughness of the face of the reflector or a surface roughness of the face of the rotator holder.

8. The heating device according to claim 1, wherein the substance having lubricity includes at least one of silicone oil or fluorine grease.

9. A fixing device comprising:

the heating device according to claim 1, configured to heat a recording medium bearing an unfixed image; and a counter rotator configured to contact an outer circumferential surface of the rotator of the heating device to fix the unfixed image onto the recording medium.

10. An image forming apparatus comprising the fixing device according to claim 9.

11. An image forming apparatus comprising the heating device according to claim 1.

* * * * *